US012807756B2

(12) United States Patent
Muñoz De Diego et al.

(10) Patent No.: US 12,807,756 B2
(45) Date of Patent: Nov. 24, 2026

(54) STABLE MODIFIED POLYMER POLYOL DISPERSIONS

(71) Applicant: REPSOL, S.A, Madrid (ES)

(72) Inventors: César Muñoz De Diego, Móstoles (ES); José Román Galdámez Peña, Móstoles (ES); Victoria Isabel Blasco Garcés, Móstoles (ES); Olivier Lemoine, Rouen (FR)

(73) Assignee: REPSOL, S.A., Madrid (ES)

( * ) Notice: Subject to any disclaimer, the term of this patent is extended or adjusted under 35 U.S.C. 154(b) by 751 days.

(21) Appl. No.: 17/126,947

(22) Filed: Dec. 18, 2020

(65) Prior Publication Data

US 2021/0189053 A1 Jun. 24, 2021

(30) Foreign Application Priority Data

Dec. 20, 2019 (EP) .................................... 19383166

(51) Int. Cl.

| | |
|---|---|
| ***C08G 18/71*** | (2006.01) |
| ***C08G 18/00*** | (2006.01) |
| ***C08G 18/08*** | (2006.01) |
| ***C08G 18/12*** | (2006.01) |
| ***C08G 18/16*** | (2006.01) |
| ***C08G 18/18*** | (2006.01) |
| ***C08G 18/20*** | (2006.01) |
| ***C08G 18/22*** | (2006.01) |
| ***C08G 18/24*** | (2006.01) |
| ***C08G 18/32*** | (2006.01) |
| ***C08G 18/38*** | (2006.01) |
| ***C08G 18/40*** | (2006.01) |
| ***C08G 18/48*** | (2006.01) |
| ***C08G 18/50*** | (2006.01) |
| ***C08G 18/76*** | (2006.01) |
| ***C08G 65/333*** | (2006.01) |
| ***C08G 65/335*** | (2006.01) |
| ***C08G 65/336*** | (2006.01) |
| ***C08G 101/00*** | (2006.01) |
| ***C08K 5/3492*** | (2006.01) |

(52) U.S. Cl.

CPC ......... *C08G 18/718* (2013.01); *C08G 18/003* (2013.01); *C08G 18/0876* (2013.01); *C08G 18/12* (2013.01); *C08G 18/165* (2013.01); *C08G 18/1833* (2013.01); *C08G 18/2027* (2013.01); *C08G 18/225* (2013.01); *C08G 18/244* (2013.01); *C08G 18/246* (2013.01); *C08G 18/3228* (2013.01); *C08G 18/388* (2013.01); *C08G 18/409* (2013.01); *C08G 18/4816* (2013.01); *C08G 18/482* (2013.01); *C08G 18/4825* (2013.01); *C08G 18/485* (2013.01); *C08G 18/509* (2013.01); *C08G 18/7621* (2013.01); *C08G 65/33396* (2013.01); *C08G 65/3353* (2013.01); *C08G 65/3355* (2013.01); *C08G 65/336* (2013.01); *C08K 5/34922* (2013.01); *C08G 2101/00* (2013.01); *C08G 2110/005* (2021.01)

(58) Field of Classification Search

CPC .. C08G 18/718; C08G 18/0976; C08G 18/12; C08G 18/388; C08G 18/4825; C08G 2110/005; C08G 18/003; C08G 18/165; C08G 18/1833; C08G 18/2027; C08G 18/225; C08G 18/244; C08G 18/246; C08G 18/3228; C08G 18/409; C08G 18/4816; C08G 18/7621; C08G 18/485; C08G 65/336; C08G 18/482; C08G 18/509; C08G 65/33396; C08G 65/3353; C08G 65/3355; C08G 2101/00; C08K 5/34922

See application file for complete search history.

(56) References Cited

U.S. PATENT DOCUMENTS

| | | | |
|---|---|---|---|
| 4,843,106 A | 6/1989 | Fis et al. | |
| 6,117,937 A | 9/2000 | Matsumoto et al. | |
| 9,550,856 B2 | 1/2017 | Cookson et al. | |
| 2009/0029043 A1 | 1/2009 | Rong et al. | |
| 2010/0209613 A1 | 8/2010 | Rong et al. | |
| 2011/0046305 A1 | 2/2011 | Schubert et al. | |
| 2013/0203880 A1 | 8/2013 | George et al. | |
| 2014/0187705 A1* | 7/2014 | Peiffer ................ | C08G 18/632 524/507 |
| 2016/0194431 A1 | 7/2016 | Amici-Kroutilova et al. | |
| 2016/0229749 A1* | 8/2016 | Mania ..................... | C04B 26/16 |
| 2021/0130528 A1 | 5/2021 | Munoz De Diego et al. | |
| 2021/0189049 A1 | 6/2021 | Munoz De Diego et al. | |

FOREIGN PATENT DOCUMENTS

| | | |
|---|---|---|
| CN | 102838712 A | 12/2012 |
| CN | 105683237 A | 6/2016 |
| GB | 2040299 A | 8/1980 |

(Continued)

OTHER PUBLICATIONS

International Search Report and Written Opinion mailed Sep. 28, 2018, for Application No. PCT/EP2018/068391, 13 pages.

(Continued)

*Primary Examiner* — Rabon A Sergent

(74) *Attorney, Agent, or Firm* — Squire Patton Boggs (US) LLP

(57) ABSTRACT

The present disclosure relates to new compounds useful as dispersants and stabilisants for modified polymer polyol dispersions, the stable modified polymer polyols dispersions thus obtained and to polyurethane materials prepared from the modified polymer polyols dispersions herein disclosed.

17 Claims, No Drawings

(56) References Cited

FOREIGN PATENT DOCUMENTS

| | | | |
|---|---|---|---|
| WO | WO 92/02567 | A1 | 2/1992 |
| WO | WO 2019/008140 | A1 | 1/2019 |

OTHER PUBLICATIONS

International Preliminary Report on Patentability mailed Jun. 24, 2019, for Application No. PCT/EP2018/068391, 6 pages.
Communication date Jun. 19, 2020, forwarding the Extended European Search Report for European Patent Application No. 19383167.4, 7 pages.
Communication dated Jun. 16, 2020 forwarding the extended European Search Report for European Patent Application No. 19383166.6, 9 pages.
ISO 16000-3 Internatonal standard; Indoor Air—Part 3: Determination of formaldehyde and other carbonyl compounds in indoor air and test chamber air—active sampling method; Oct. 15, 2011; 34 pages.
ISO 16000-9 Spanish standard; UNE-EN Indoor Air—Part 9: Determination of the emission of volatile organic compounds from building products and furnishing; Emission test chamber method (ISO 16000-9:2006); Nov. 2006; 24 pages.
ISO 16000-11 Spanish standard; UNE-EN Indoor Air—Part 11: Determination of the emission of volatile organic compounds from building products and furnishing; sampling, storage of samples and preparation of test specimens (ISO 16000-11:2006); Nov. 2006; 22 pages.
ASTM D-4274-16 International Standard Test Methods for testing polyurethane raw materials: Determination of hydroxyl numbers of polyols; 2017; 10 pages.
Standard UL 94; Test for flammability of plastic materials for parts in devices and appliances; May 22, 2001; ISBN 0-7629-0082-2; 52 pages.
Standard UL 94; Test for flammability of plastic materials for parts in devices and appliances; Mar. 28, 2013; revised Jun. 27, 2020; 42 pages.
ISO 845 Spanish standard; UNE-EN Cellular plastics and rubbers Determination of apparent density (ISO 845:2006); Feb. 2010; 13 pages.
ISO 1856 Spanish standard; UNE-EN Flexible cellular polymeric materials Determination of compression set (ISO 1856:2018); Jun. 2019; 12 pages.
ISO 3386-1 Spanish standard; UNE-EN Polymeric materials, cellular flexible Determination of stress-strain characteristics in compression (ISO 3386-1:1986); Sep. 1998; 11 pages.
ISO 8307 Spanish standard; UNE-EN Flexible cellular polymeric materials Determination of resilience by ball rebound (ISO 8307:2018); Jun. 2019; 15 pages.

* cited by examiner

STABLE MODIFIED POLYMER POLYOL DISPERSIONS

CROSS-REFERENCE

This application claims the benefit of and priority to European Patent Application EP19383166.6 filed on Dec. 20, 2019, incorporated herein by reference in its entirety.

The present disclosure relates to new compounds useful as dispersants and stabilisants for modified polymer polyol dispersions.

BACKGROUND

A variety of modified polymer polyols are used as raw materials for manufacturing flexible polyurethane foam and other polyurethane products. They have a continuous phase made up of one or more compounds having multiple hydroxyl groups ("base polyol") into which another polymer is dispersed in the form of particles.

Thus, example of modified polymer polyols are:

- Poly Harnststoff Dispersion (PHD) polyols which are modified polymer polyols which comprise in a dispersed form a polyurea which is the polycondensation reaction product of a polyamine with a polyfunctional isocyanate;
- Graft polyether polyols which are synthesised by in situ radical polymerisation of vinylic monomers in liquid polyethers, by batch, semi-continuous or continuous process wherein the vinylic monomer is generally selected from acrylonitrile, styrene, alpha-methyl styrene methylmethacrylate, hydroxyalkyl acrylates and methacrylates, vinyl chloride and others;
- Polyisocyanate Polyaddition (PIPA) polymer polyols which are dispersions of polyurethane and/or polyurethane-urea particles in a liquid polyether polyol, resulting from the polymerization of an alkanolamine with an organic polyisocyanate in the presence of a polyol;
- and most recently described, polymer polyols comprising a polyether carbonate polyol as the base polyol, the polyether carbonate polyols (POPC) being obtainable by a process comprising copolymerizing one or more H-functional initiator substances, one or more alkylene oxides and carbon dioxide in the presence of a double metal cyanide catalyst (DMC).

In our previous patent application WO2019008140, were disclosed new modified polymer polyols comprising at least one base polyol and a stable dispersion of polymeric particles in the at least one base polyol, the modified polymer polyol being obtainable by a process comprising the preparation of the polymeric particles in the presence of the at least one base polyol by a polycondensation reaction of a. at least one compound bearing at least one basic-nitrogen atom characterized by the presence in the molecule of at least one hydrogen atom attached to a nitrogen atom; with b. at least one compound bearing a phosphorus atom selected from the group consisting of b1. a compound bearing a phosphorus atom which is selected from the group consisting of at least one hydroxyalkylphosphine, at least one hydroxyalkylphosphonium salt, at least one hydroxyalkylphosphine oxide and a combination thereof; or b2. a condensation product from the mixture of compounds b1) and at least one compound bearing at least one basic nitrogen atom.

Regarding the base polyol used in the preparation of these modified polymer polyols, they may be either polyether polyols or polyesterpolyols. Polyether polyols are manufactured commercially by polymerizing propylene oxide and or ethylene oxide in the presence of hydroxyl or amino group-containing initiators and basic catalysts. Polyesterpolyols are made by the polycondensation reaction of multifunctional carboxylic acids and polyhydroxyl compounds.

Among the polyether polyols, it is possible to differentiate between reactive and non-reactive polyether polyols. Reactive polyols are ethylene oxide (EO) capped polyether polyols, having a content of polyethylene oxide terminal blocks of 5-20 wt %; so they bear a high content of primary hydroxyl group (higher than 30%); whereas non-reactive polyols are propylene oxide (PO) capped polyether polyols, bearing mainly secondary hydroxyl groups. Secondary hydroxyl groups are less reactive than primary hydroxyl groups.

It is known in the art that PIPA and PHD polymer polyols prepared using polyether polyols containing mainly secondary hydroxyl groups led to the formation of polymer particles that are not stable in the base polyol.

Different approaches to stabilise modified polymer polyols, have been proposed. Thus, introduction during the polymerisation a non-aqueous dispersant (NAD) stabiliser has been one of the proposed solutions. Stabilisation of polymeric dispersions in organic media is based on the principles of steric stabilisation, which is assured by the presence of nonaqueous dispersants (NAD) stabilisers. Thus, for example, in the case of graft polyether polyols, the NAD comprises in the same chemical structure a segment with a strong affinity for the carbocatenary vinylic polymer and a second segment with a strong affinity for the liquid polyether. The NAD is linked on the surface of solid polymeric particles with the polymeric carbocatenary segment, the polyetheric chains at the exterior part of the polymeric particles situated in the continuous polyetheric media, forming a steric hinderance which prevents the agglomeration of polymer particles.

Different examples of NAD-stabilisers are known in the art, nevertheless, in view of the new developments in modified polymeric polyols and the different approaches and their different chemical and physical properties, currently there exists a need for new stabilisers for modified polymer polyols comprising at least one base polyol and a stable dispersion of polymeric particles in the at least one base polyol. More particularly there exists a need to provide new stabilisers for modified polymer polyol dispersions comprising at least one base polyol and a stable dispersion of polymeric particles in the at least one base polyol, wherein the base polyol is reactive or non-reactive polyether polyol.

SUMMARY

It has now been found that stable modified polymer polyol dispersions may be prepared by polymerising one or more polymeric particle precursor in the presence of the at least one base polyol containing at least one new alkoxysilane group-modified compound as described below which works as a non-aqueous dispersant. The resulting modified polymer polyol dispersion shows an improvement in its stability when compared with those modified polymer dispersions prepared in absence of the at least one alkoxysilane group-modified compound, i.e. the modified polymer polyol dispersion does not settle out during storage for a longer period of time, or at least will remain in dispersion during mixing with other foam forming ingredients.

The new alkoxysilane group-modified compounds according to the present disclosure, work as non-aqueous dispersants (NAD) for modified polymer polyol dispersions and have the advantage that they are easily prepared under mild reaction conditions, optionally they may be prepared in situ in the reaction media of the modified polymeric polyol dispersion. Furthermore, the new alkoxysilane group-modified compounds herein disclosed are useful for stabilize modified polymer polyols obtained using either a reactive polyether polyol or a non-reactive polyether polyol as the base polyol.

Therefore, in accordance with a first aspect of the present disclosure, there are provided new alkoxysilane group-modified compounds. The new alkoxysilane group-modified compounds are suitable for use as NAD stabilizers in the preparation of modified polymer polyol dispersions.

The new alkoxysilane group-modified compounds herein disclosed may be described as a alcoxysilane-capped polyether polyol having from 1 to 8 hydroxyl groups per molecule and from 1 to 2 alcoxysilane groups per molecule, preferably 1. The new alcoxysilane-capped polyether polyols are obtainable by a process comprising capping from 1 to 2, preferably 1, of the terminal hydroxyl groups of a polyether polyol having a functionality from 2 to 9 and an average molecular weight from 3000 to 25000 with a capping agent which is a compound having at least one alcoxysilane terminal group and at least one hydroxyl-reactive group; wherein the reaction of the capping agent with the polyether polyol is carried out in a molar ratio from 0.05 to 2.0 mole, preferably from 0.2 to 1.8 mole, more preferably from 0.5 to 1.5 mole, being particularly preferably from 0.8 to 1.2 mole of capping agent per mole of polyether polyol.

The new alkoxysilane group-modified compounds according to the present invention are obtainable by reaction of:

a) at least a polyether polyol having a functionality from 2 to 9, and an average molecular weight from 3000 to 25000; with
b) at least a capping alkoxysilane group-containing agent which is a compound of formula (I)

(I)

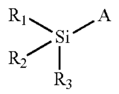

wherein R1, R2 and R3 are each independently selected from linear or branched (C1-C6)alkyl radical, linear or branched (C1-C6)alkoxyl radical and tri(C1-C3)alkylsilyloxyl radical; with the proviso that at least one of R1, R2 or R3 is a (C1-C6)alkoxyl radical; and
wherein A is a radical group comprising a terminal functional group which is reactable with the hydroxyl groups on the polyether polyol;
and wherein the reaction of the capping alkoxysilane group-containing agent with the polyether polyol is carried out in a molar ratio from 0.05 to 2.0 mole, preferably from 0.2 to 1.8 mole, more preferably from 0.50 to 1.5 mole, being particularly preferably from 0.8 to 1.2 mole of capping agent per mole of polyether polyol.

In accordance with some preferred embodiments, A is a radical group comprising a terminal functional group reactable with the hydroxyl groups on the polyether polyol which is selected from —NCO and epoxide.

The alkoxysilane group-modified compounds of the present disclosure are useful for stabilizing modified polymer polyols; wherein the modified polymer polyol is a polymer polyol having organic fillers dispersed therein. The modified polymer polyol dispersion may be preferably a PIPA polyol, a PHD polyol or any other polymeric polyol known in the art. In accordance with a particularly preferred embodiment, the modified polymer polyol dispersions are those obtained using the mixture of hydroxyalkylphosphine (e.g. [bis(hydroxymethyl)phosphanyl]methanol (THP)) and its derivatives (including salts, oxides and hemiacetals) as polymeric particle precursors.

It is known that when a tetrakis(hydroxymethyl)phosphonium salt (THPX) is reacted with a base (e.g. KOH), then it may be obtained a mixture of THP, formaldehyde, the salt KX and water; additionally, depending on the basic conditions used, [bis(hydroxymethyl)phosphoryl]methanol (THPO, also known as tris(hydroxymethyl) phosphine oxide) may also be obtained as co-product together with THP; besides, THP and THPO may react with formaldehyde forming the corresponding hemiformals (mono-, di- and tri-substituted hemiformals of THP and THPO can be found as reaction products). In some cases, it is possible to perform the reaction with defect of base, in that case, non reacted THPX may be present in the reaction media in combination with the obtained products. The quantity of THPO formed depends on the reaction conditions. Basic pH favours the concentration of THPO. Therefore, the product of the reaction between THPX and a base, depending on the conditions used, may be a complex mixture of phosphorus compounds (THP, THPO, their corresponding hemiformals and unreacted THPX), water, the corresponding salt and formaldehyde.

Chemical name and structure of the above mentioned THP, THPX, THPO, and mono-, di- and tri-substituted hemiformals of THP and THPO (mTHP, dTHP, tTHP, mTHPO and dTHPO) are as follows:

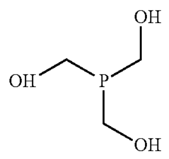

[bis(hydroxymethyl)phosphanyl]methanol (THP)

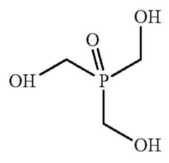

[bis(hydroxymethyl)phosphoryl]methanol (THPO)

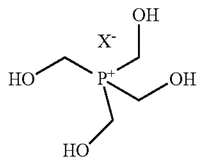

tetrakis(hydroxymethyl)phosphoniurn salt (THPX)

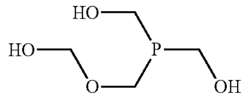

{[bis(hydroxymethyl)phosphanyl]methoxy}methanol (mTHP)

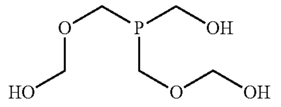

{bis[(hydroxymethoxy)methyl]phosphanyl}methanol (dTHP)

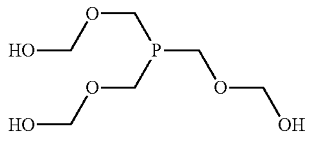 [SMILES: OCOCP(COCO)COCO]

({bis[(hydroxymethoxy)methyl]phosphanyl}methoxy) methanol (tTHP)

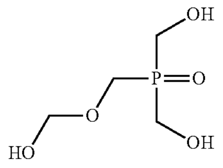

{[bis(hydroxymethyl)phosphoryl]methoxy}methanol (mTHPO)

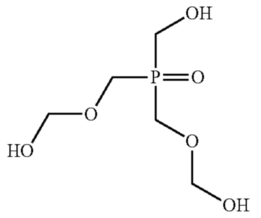 [SMILES: O=P(CO)(COCO)COCO]

{bis[(hydroxymethoxy)methyl]phosphoryl}methanol (dTHPO)

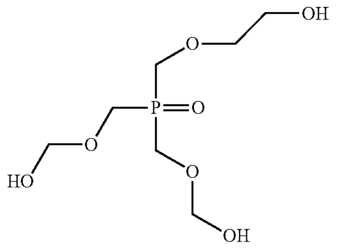 [SMILES: O=P(COCO)(COCO)COCCO]

({bis[(hydroxymethoxy)methyl]phosphoryl}methoxy)methanol (tTHPO)

It is desirable to reduce the formaldehyde release, without compromising the stability of polyurethane materials prepared using the modified polymer polyol dispersions prepared starting from a mixture of hydroxyalkylphosphine and its derivatives (including salts, oxide and hemiacetals) as polymeric particle precursors, i.e. without the agglomeration and precipitation of the polymeric particles, in particular using the modified polymer polyol dispersions as prepared according to the method described in WO2019008140.

The free formaldehyde content can be reduced form the mixture of phosphorous-containing components, i.e. the mixture of THP, its salts, oxide and/or hemiformals, by distillation. The volatile compounds, including the formaldehyde, can be distilled off at reduced or atmospheric pressure at a distillation temperature from 50-120° C. Unfortunately, the use of the resulting mixture of phosphorous-containing components in the preparation of the modified polymer polyols according to the methodology described in the patent application WO2019008140 leads to a non-stable modified polymer polyol due to the agglomeration and precipitation of the polymer particles.

Therefore, it is also an object of the present disclosure the use of the alkoxysilane group-modified compounds herein disclosed in the preparation of modified polymer polyol dispersions, more particularly as stabilizers and dispersants of modified polymer polyol dispersions. Thus, the alkoxysilane group-modified compounds according to the present disclosure are useful as dispersants and stabilizers of PHD polyols, PIPA polyols, and preferably those modified polymer polyols prepared starting from a mixture of hydroxyalkylphosphine and its derivatives (including salts, oxide and hemiacetals) as polymeric particle precursors as disclosed in WO2019008140.

An additional aspect of the present invention refers to stable modified polymer polyol dispersions of polymeric particles in a liquid polyol mixture, the stable modified polymer polyol dispersions are obtainable by a process comprising the preparation of polymeric particles, in the presence of the liquid polyol mixture, by a. reacting, in the liquid polyol mixture and under polymerisation conditions at least one compound bearing at least one basic-nitrogen atom a.1) characterized by the presence in the molecule of at least one hydrogen atom attached to a nitrogen atom; with a mixture of compounds bearing a phosphorus atom a.2) comprising [bis(hydroxymethyl)phosphanyl]metanol (THP) and optionally any of its derivaties such as a tetrakis(hydroxymethyl) phosphonium salt (THPX), [bis(hydroxymethyl)phosphoryl]methanol (THPO) and its mono-, di- or tri-hemiacetals ({[bis(hydroxymethyl) phosphanyl]methoxy}methanol (mTHP), {bis[(hydroxymethoxy)methyl]phosphanyl}methanol (dTHP), {bis[(hydroxymethoxy)methyl]phosphanyl}methoxy) methanol (tTHP), {[bis(hydroxymethyl)phosphoryl] methoxy}methanol (mTHPO), {bis[(hydroxymethoxy) methyl]phosphoryl}methanol (dTHPO) and ({bis [(hydroxymethoxy)methyl]phosphoryl}methoxy) methanol (tTHPO); or the mixture of condensation products a.3) resulting from the reaction of the mixture of compounds bearing a phosphorus atom a.2) as described above and the at least one compound bearing at least one basic nitrogen atom a.1);

wherein the compound bearing at least one basic-nitrogen atom a.1) is selected from melamine, trimethylol melamine;

those compounds of formula (VII) or formula (VIII); and mixtures thereof;

wherein the compounds of formula (VII) are as follows $R_1$—$NH_2$ (VII)

wherein $R_1$ is selected from —H, —($C_1$-$C_3$)Alkyl-CO—, $NH_2$—CO—, —$(CH_2)_n$—$NH_2$, —CN, —$NH_2$, —$SO_2NH_2$, cyclohexyl, phenyl, —$SO_2OH$ and —$NHCONHNH_2$; wherein n is an integer from 1-18; and the compounds of formula (VIII) are as follows:

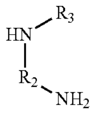

(VIII)

wherein $R_2$ is selected from NH═C<, O═C<, and S═C<, and $R_3$ is selected from H, —CN, —$NH_2$, —$CONH_2$, —$CONHCONH_2$, and —$CONHCONHCONH_2$;

or alternatively b. reacting, in the liquid polyol mixture and under polymerisation conditions, optionally in the presence of a catalyst, b.1) at least one of a co-reactant having an equivalent weight of up to 400 and at least one active hydrogen attached to a nitrogen or oxygen atom; preferably the at least one co-reactant is selected from an amine, an alkanolamine or a diol; with b.2) at least one polyisocyanate;

wherein the liquid polyol mixture comprises at least one base polyol and at least one alkoxysilane group-modified compound as defined herein.

Therefore, the stable modified polymer polyols according to the present invention comprise a stable dispersión of polymeric particles in a liquid polyol mixture comprising at least one base polyol and at least one alkoxysilane group-modified compound as defined herein.

In accordance with one aspect of the present disclosure, it is provided a process for preparing stable modified polymer polyol dispersions comprising preparing a liquid polyol mixture of at least one base polyol and at least one alkoxysilane group-modified compound as described herein, and adding the polymeric particle precursors in order to obtain a polymeric polyol dispersion in the liquid polyol mixture.

Thus, in according to this aspect of the present invention, it is provided a process for the preparation of a stable modified polymer polyol dispersion, the process comprising mixing simultaneously or sequentially in any order:

i. a polymeric particle precursor comprising the mixture of the at least one compound bearing at least one basic-nitrogen atom a.1); and at least one of the group consisting of the mixture of compounds bearing a phosphorus atom a.2) or the mixture of condensation products a.3) as defined herein;

ii. at least one base polyol;

iii. at least one alkoxysilane group-modified compound as defined herein.

In accordance with a particular realisation, the process comprises i) mixing at least one base polyol with the at least one alkoxysilane group-modified compound as defined herein, thus obtaining a liquid polyol mixture;

ii) adding to the liquid polyol mixture obtained in i) simultaneously or sequentially, in any order the at least one compound bearing at least one basic-nitrogen atom a.1) characterized by the presence in the molecule of at least one hydrogen atom attached to a nitrogen atom; and either the mixture of compounds bearing a phosphorus atom a.2) comprising [bis(hydroxymethyl)phosphanyl] metanol (THP) and optionally any of its derivaties such as a tetrakis(hydroxymethyl) phosphonium salt (THPX), [bis(hydroxymethyl)phosphoryl]methanol (THPO) and its mono-, di- or tri-hemiacetals ({[bis (hydroxymethyl)phosphanyl]methoxy}methanol (mTHP), {bis[(hydroxymethoxy)methyl] phosphanyl}methanol (dTHP), {bis[(hydroxymethoxy)methyl]phosphanyl}methoxy)methanol (tTHP), {[bis(hydroxymethyl)phosphoryl] methoxy}methanol (mTHPO), {bis [(hydroxymethoxy)methyl]phosphoryl}methanol (dTHPO) and ({bis[(hydroxymethoxy)methyl] phosphoryl}methoxy)methanol (tTHPO); or the mixture of condensation products a.3) resulting from the reaction of the mixture a.2) as described above and at least one compound bearing at least one basic nitrogen atom a.1);

wherein the compound bearing at least one basic-nitrogen atom a.1) is selected from melamine, trimethylol melamine;

those compounds of formula (VII) or formula (VIII); and mixture thereof;

wherein the compounds of formula (VII) are as follows $R_1—NH_2$ (VII)

wherein $R_1$ is selected from —H, —$(C_1$-$C_3)$Alkyl, $(C_1$-$C_3)$Alkyl-CO—, —$NH_2$—CO—, —$(CH_2)_n$—$NH_2$, —CN, —$NH_2$, —$SO_2NH_2$, cyclohexyl, phenyl, —$SO_2OH$ and —$NHCONHNH_2$; wherein n is an integer from 1-18;

and the compounds of formula (VIII) are as follows:

(VIII)

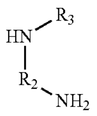

wherein $R_2$ is selected from NH═C<, O═C< and S═C<, and $R_3$ is selected from H, —CN, —$NH_2$, —$CONH_2$, —$CONHCONH_2$, and —$CONHCONHCONH_2$.

Thus, in accordance with this first realisation, the polymeric particle precursors are the at least one compound bearing at least one basic-nitrogen atom a.1) and either the mixture a.2) or the mixture a.3); the resulting polymeric particles have a high content of P and N.

In accordance with another embodiments, optionally in combination with one or more features of the various embodiments described above or below, the preparation of the modified polymer polyols comprises i) mixing at least one base polyol with the at least one alkoxysilane group-modified compound as defined above, thus obtaining a liquid polyol mixture;

ii) adding to the liquid polyol mixture obtained in i) simultaneously or sequentially, in any order, optionally in the presence of a catalyst, and under polymerisation conditions, b.1) at least one of a co-reactant having an equivalent weight of up to 400 and at least one active hydrogen attached to a nitrogen or oxygen atom and b.2) at least one polyisocyanate.

Thus, embodiments of this realisation provide for a polymer polyol blend which includes PIPA and/or PHD particles which have been formed in situ in the liquid polyol mixture containing the at least one alkoxysilane group-modified compound as defined above.

In another aspect of the present disclosure, it is provided a process for preparing a polyurethane material wherein at least one polyisocyanate is reacted with an isocyanate-reactive component which comprises at least one stabilized modified polymer polyol dispersion as described herein, the reaction optionally being carried out in the presence of water and additives such as at least one blowing agent, at least one catalyst and tensioactive products.

Another aspect of the present disclosure provides a polyurethane material obtainable by a process comprising the reaction of at least one polyisocyanate component, with an isocyanate-reactive component which comprises at least one of the herein disclosed stabilized modified polymer polyol, in the presence of at least one catalyst and optionally at least one blowing agent.

Additional aspects of the present disclosure refer to an injection molding composition or an article of manufacture comprising the polyurethane material as mentioned above.

The modified polymeric polyols of the present disclosure are useful for the preparation of polyurethane materials such as polyurethane foams, adhesives, elastomers, sealants and coatings; being preferred those polyurethane materials with flame retardant properties due to a high content of P and N of the dispersed polymeric particles.

Another aspect of the present disclosure refers to a method for reducing the emission of formaldehyde from a polyurethane material by using a modified polymer polyol dispersion as defined herein in the preparation of the polyurethane material.

It is also an object of the present invention to provide a method for the preparation of a polyurethane foam with a formaldehyde emission lower than 100 (pg/$m^3$), preferably bellow 10 (μg/$m^3$) as measured by UNE-ISO 16000-[Items 3, 9 and 11] standard method, following the indications of the CertiPUR Label for Flexible Polyurethane Foams. The method comprises the use of the stable modified polymer polyol dispersion as described herein in the preparation of the polyurethane foam.

DETAILED DESCRIPTION

In accordance with some embodiments, optionally in combination with one or more features of the various embodiments described above or below, the alkoxysilane group-modified compounds are obtained by reacting a) at least a polyether polyol having a functionality from 2 to 9, and an average molecular weight from 3000 to 25000; with b) at least a capping alkoxysilane group-containing agent which is a compound of formula (I) as defined above;

and wherein the reaction of b) with a) is carried out in a molar ratio from 0.05 to 2.0 mole, preferably from 0.2 to 1.8 mole, more preferably from 0.5 to 1.5 mole, being particularly preferably from 0.8 to 1.2 mole of capping agent per mole of polyether polyol.

Thus, in accordance with certain embodiments, optionally in combination with one or more features of the various embodiments described above or below, suitable capping alkoxysilane group-containing agent may be any alkoxysilane group-containing compound according to formula (I) wherein A is a radical group comprising a terminal functional group reactable with the hydroxyl groups on the polyether polyol, being the terminal functional group reactable with the hydroxyl groups selected from —NCO and epoxide.

In accordance with certain embodiments, optionally in combination with one or more features of the various embodiments described above or below, the compound of formula (I) is selected from those wherein radical A is selected from the group consisting of those compounds of formula (II), (III), (IV), (V) and (VI)

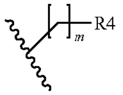

(II)

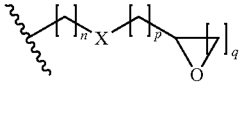

(III)

-continued (IV)

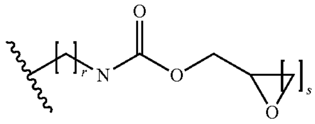

(V)

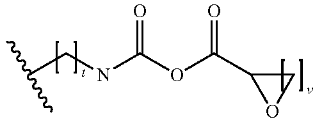

(VI)

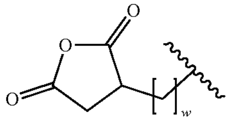

wherein the wavy line means the point of attachment to the Si atom in formula (I);

m, n, p, r, t and w are independently an integer selected from 1 to 6;

q, s and v are independently an integer selected from 1 to 4;

R4 is a radical selected from -NCO,

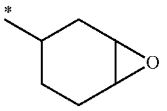

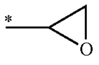

wherein the asterisk indicates the point of attachment to the rest of group

X is selected from —O— and —N(R5)—;

wherein R5 is a radical selected from H, linear or branched (C1-C6)alkyl,

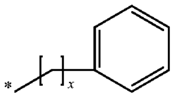

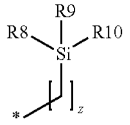

wherein the asterisk indicates the point of attachment to the N atom;

x and z are independently an integer selected from 1 to 6;

and R8, R9 and R10 are each independently selected from linear or branched (C1-C6)alkyl radical, linear or branched (C1-C6)alkoxyl radical and tri(C1-C3)alkylsilyloxyl radical; with the proviso that at least one of R8, R9 or R10 is a (C1-C6)alkoxyl radical or a tri(C1-C3)alkylsilyloxyl radical;

and wherein the reaction of b) with a) is carried out in a molar ratio from 0.05 to 2.0 mole, preferably from 0.2 to 1.8 mole, more preferably from 0.50 to 1.5 mole, being particularly preferably from 0.8 to 1.2 mole of capping agent per mole of polyether polyol.

In accordance with certain embodiments, optionally in combination with one or more features of the various embodiments described above or below, the compounds of formula (I) are those wherein at least R1, R2 and R3 are each independently selected from $CH_3$—O—, $CH_3CH_2$—O—, $CH_3CH_2CH_2$—O—, $(CH_3)_2CH$—O—, $CH_3CH_2CH_2CH_2$—O—, $(CH_3)_3CH$—O—, $(CH_3)_2CHCH_2$—O—, $CH_3$—, $CH_3CH_2$—, $CH_3CH_2CH_2$—, $(CH_3)_2CH$—, $CH_3CH_2CH_2CH_2$—, $(CH_3)_3CH$—, $(CH_3)_2$ $CHCH_2$—, $(CH_3)_3Si$—O—, and $(CH_3CH_2)_3Si$—O—, with the proviso that at least one of R1, R2 or R3 is a (C1-C3)alkoxyl radical.

In some particular embodiments, optionally in combination with one or more features of the various embodiments described above or below, the compounds of formula (I) are those wherein R1, R2 and R3 are each independently selected from $CH_3$—O—, $CH_3CH_2$—O—, $CH_3$—, $CH_3CH_2$—, and $(CH_3)_3Si$—O—, with the proviso that at least one of R1, R2 or R3 is selected from $CH_3$—O—, and $CH_3CH_2$—O—.

In accordance with one embodiment of the present invention, optionally in combination with one or more features of the various embodiments described above or below, the compounds of formula (I) are selected from

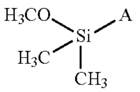
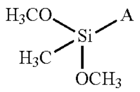
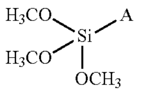
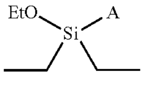
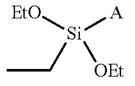
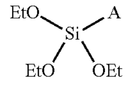

In certain embodiments, optionally in combination with one or more features of the various embodiments described above or below, the radical A is selected from those compounds of formula (II) as described above.

In one embodiment, optionally in combination with one or more features of the various embodiments described above or below, the radical A is selected from those compounds of formula (II) wherein m is an integer from 1 to 6; particularly 1, 2, 3, 4, 5 or 6; more particularly 2 or 3; and R4 is —NCO,

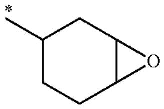

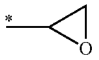

wherein the asterisk indicates the point of attachment to the rest of group; and wherein the reaction of b) with a) is carried out in a molar ratio from 0.05 to 2.0 mole, preferably from 0.2 to 1.8 mole, more preferably from 0.50 to 1.5 mole, being particularly preferably from 0.8 to 1.2 mole of capping agent per mole of polyether polyol.

In accordance with a particular embodiment, optionally in combination with one or more features of the various embodiments described above or below, the compound of formula (I) is selected from (3-isocyanatopropyl)trimethoxysilane (also known as 3-(trimethoxysilyl)propyl isocyanate), (3-isocyanatopropyl)dimethoxy(methyl)silane, (3-isocyanatopropyl)(methoxy)dimethylsilane, (3-isocyanatopropyl)dimethoxy ethylsilane, diethyl(3-isocyanatopropyl) methoxysilane, (3-isocyanatopropyl)triethoxysilane (also known as 3-(triethoxysilyl)propyl isocyanate), diethoxy(3-isocyanatopropyl)methylsilane, ethoxy(3-isocyanatopropyl) dimethylsilane, (3-isocyanatopropyl)diethoxy(ethyl)silane, ethoxydiethyl(3-isocyanatopropyl)silane, trimethoxy(2-isocyanatoethyl)silane, (2-isocyanatoethyl)dimethoxy(methyl)

silane, (2-isocyanatoethyl)(methoxy)dimethylsilane, ethyl (2-isocyanatoethyl)dimethoxysilane, diethyl(2-isocyanatoethyl)methoxysilane, triethoxy(2-isocyanatoethyl)silane, diethoxy(2-isocyanatoethyl)methylsilane, ethoxy(2-isocyanatoethyl)dimethylsilane, diethoxy(ethyl)(2-isocyanatoethyl)silane, ethoxydiethyl(2-isocyanatoethyl)silane, triethoxy(isocyanatomethyl)silane, (isocyanatomethyl) trimethoxysilane, trimethoxy({7-oxabicyclo[4.1.0]heptan-3-yl}methy)silane, triethoxy({7-oxabicyclo[4.1.0]heptan-3-yl}methyl)silane, trimethoxy(2-{7-oxabicyclo[4.1.0] heptan-3-yl}ethyl)silane, diethoxy(methyl)(2-{7-oxabicyclo[4.1.0]heptan-3-yl}ethyl)silane, triethoxy(2-{7-oxabicyclo[4.1.0]heptan-3-yl}ethyl)silane, triethoxy(3-{7-oxabicyclo[4.1.0]heptan-3-yl}propyl)silane, trimethoxy(3-{7-oxabicyclo[4.1.0]heptan-3-yl}propyl)silane, triethoxy(4-{7-oxabicyclo[4.1.0]heptan-3-yl}butyl)silane, and trimethoxy (4-{7-oxabicyclo[4.1.0]heptan-3-yl}butyl)silane.

In certain embodiments, optionally in combination with one or more features of the various embodiments described above or below, the radical A is selected from those compounds of formula (III) as described above. In one embodiment, optionally in combination with one or more features of the various embodiments described above or below, the radical A is selected from those compounds of formula (III) wherein n and p are independently an integer selected from 1 to 6; particularly 1, 2, 3, 4, 5 or 6; more particularly 2, 3 or 4; and q is an integer selected from 1 to 4; particularly 1, 2, 3 or 4, more particularly 1 or 3.

In accordance with one particular embodiment, optionally in combination with one or more features of the various embodiments described above or below, the radical A is selected from those compounds of formula (III) wherein n and p are independently an integer selected from 1, 2, 3, or 4;

q is an integer selected from 1 or 3;

X is selected from —O— and —N(R5)—;

wherein R5 is a radical selected from H, linear or branched (C1-C6)alkyl,

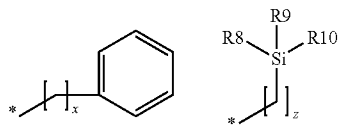

wherein the asterisk indicates the point of attachment to the N atom;

x and z are independently an integer selected from 1 to 6; and R8, R9 and R10 are each independently selected from —$CH_3$, —$CH_2CH_3$, —$OCH_3$, —$OCH_2CH_3$, —O—Si $(CH_3)3$, and -0-$Si(CH_2CH_3)_3$; and wherein the reaction of b) with a) is carried out in a molar ratio from 0.05 to 2.0 mole, preferably from 0.2 to 1.8 mole, more preferably from 0.50 to 1.5 mole, being particularly preferably from 0.8 to 1.2 mole of capping agent per mole of polyether polyol.

In accordance with a particular embodiment, optionally in combination with one or more features of the various embodiments described above or below, the compound of formula (I) is selected from trimethoxy({3-[(oxiran-2-yl) methoxy]propyl})silane (also known as glycidoxypropyltrimethoxysilane), dimethoxy(methyl){3-[(oxiran-2-yl) methoxy]propyl}silane, methoxydimethyl{3-[(oxiran-2-yl) methoxy]propyl}silane, dimethoxy(ethyl){3-[(oxiran-2-yl) methoxy]propyl}silane, diethyl(methoxy){3-[(oxiran-2-yl) methoxy]propyl}silane, triethoxy({3-[(oxiran-2-yl) methoxy]propyl})silane (also known as glycidoxypropyltriethoxysilane), diethoxy(methyl){3-[(oxiran-2-yl) methoxy]propyl}silane, ethoxydimethyl{3-[(oxiran-2-yl) methoxy]propyl}silane, diethoxy-ethyl-[3-(oxiran-2-ylmethoxy)propyl]silane, ethoxydiethyl{3-[(oxiran-2-yl) methoxy]propyl}silane, trimethoxy({2-[(oxiran-2-yl) methoxy]ethyl})silane, dimethoxy(methyl){2-[(oxiran-2-yl) methoxy]ethyl}silane, methoxydimethyl{2-[(oxiran-2-yl) methoxy]ethyl}silane, ethyldimethoxy{2-[(oxiran-2-yl) methoxy]ethyl}silane, diethyl(methoxy){2-[(oxiran-2-yl) methoxy]ethyl}silane, triethoxy({2-[(oxiran-2-yl)methoxy] ethyl})silane, diethoxy(methyl){2-[(oxiran-2-yl)methoxy] ethyl}silane, ethoxydimethyl{2-[(oxiran-2-yl)methoxy] ethyl}silane, diethoxy(ethyl){2-[(oxiran-2-yl)methoxy] ethyl}silane, diethoxy(ethyl){2-[(oxiran-2-yl)methoxy] ethyl}silane, trimethoxy({[(oxiran-2-yl)methoxy]methyl}) silane, dimethoxy(methyl){[(oxiran-2-yl)methoxy] methyl}silane, methoxydimethyl{[(oxiran-2-yl)methoxy] methyl}silane, ethyldimethoxy{[(oxiran-2-yl)methoxy] methyl}silane, diethyl(methoxy){[(oxiran-2-yl)methoxy] methyl}silane, triethoxya({[(oxiran-2-yl)methoxy]methyl}) silane, diethoxy(methyl){[(oxiran-2-yl)methoxy] methyl}silane, ethoxydimethyl{[(oxiran-2-yl)methoxy] methyl}silane, diethoxy(ethyl){[(oxiran-2-yl)methoxy] methyl}silane, ethoxydiethyl{[(oxiran-2-yl)methoxy] methyl}silane, butyl[(oxiran-2-yl)methyl][3-(trimethoxysilyl)propyl]amine, butyl[(oxiran-2-yl)methyl] [3-(triethoxysilyl)propyl]amine, ethyl[(oxiran-2-yl)methyl] [3-(trimethoxysilyl)propyl]amine, ethyl[(oxiran-2-yl) methyl][3-(triethoxysilyl)propyl]amine, methyl[(oxiran-2-yl)methyl][3-(trimethoxysilyl)propyl]amine, methyl [(oxiran-2-yl)methyl][3-(triethoxysilyl)propyl]amine, N-[(oxiran-2-yl)methyl]-N-[3-(trimethoxysilyl)propyl]aniline, N-[(oxiran-2-yl)methyl]-N-[3-(triethoxysilyl)propyl] aniline, N-[(oxiran-2-yl)methyl]-N-[(trimethoxysilyl) methyl]aniline, N-[(oxiran-2-yl)methyl]-N-[(triethoxysilyl) methyl]aniline, methyl[(oxiran-2-yl)methyl] [(trimethoxysilyl)methyl]amine, methyl[(oxiran-2-yl) methyl][(triethoxysilyl)methyl]amine 3-(trimethoxysilyl)-N-(3-(trimethoxysilyl)propyl)-N-((oxiran-2-yl)methyl) propan-1-amine, 3-(triethoxysilyl)-N-(3-(triethoxysilyl) propyl)-N-((oxiran-2-yl)methyl)propan-1-amine and N,N-bis((trimethoxysilyl)methyl)(oxiran-2-yl)methanamine, and N, N-bis((triethoxysilyl)methyl)(oxiran-2-yl)methanamine.

In certain embodiments, optionally in combination with one or more features of the various embodiments described above or below, the radical A is selected from those compounds of formula (IV) or (V) as described above. In one embodiment, optionally in combination with one or more features of the various embodiments described above or below, the radical A is selected from those compounds of formula (IV) or (V) wherein r and t are independently an integer selected from 1, 2, 3, or 4; and s is an integer selected from 1 to 3;

and wherein the reaction of b) with a) is carried out in a molar ratio from 0.05 to 2.0 mole, preferably from 0.2 to 1.8 mole, more preferably from 0.50 to 1.5 mole, being particularly preferably from 0.8 to 1.2 mole of capping agent per mole of polyether polyol.

In accordance with a particular embodiment, optionally in combination with one or more features of the various embodiments described above or below, the compound of formula (I) is selected from (oxiran-2-yl)methyl N-[3-

(trimethoxysilyl)propyl]carbamate, (oxiran-2-yl)methyl-N-[3-(triethoxysilyl)propyl]carbamate, (oxiran-2-yl)methyl-N-[4-(trimethoxysilyl)butyl]carbamate, (oxiran-2-yl)methyl-N-[4-(triethoxysilyl)butyl]carbamate, (oxiran-2-yl)methyl-N-[2-(trimethoxysilyl)ethyl]carbamate, (oxiran-2-yl) methyl-N-[2-(triethoxysilyl)ethyl]carbamate, (oxiran-2-yl) methyl-N-[(trimethoxysilyl)methyl]carbamate, (oxiran-2-yl)methyl-N-[(triethoxysilyl)methyl]carbamate, 3-trimethoxysilylpropylcarbamoyl oxirane-2-carboxylate, 3-triethoxysilylpropylcarbamoyl oxirane-2-carboxylate, oxirane-2-carbonyl-N-[(trimethoxysilyl)methyl]carbamate, oxirane-2-carbonyl-N-[(triethoxysilyl)methyl]carbamate, oxirane-2-carbonyl-N-[4-(trimethoxysilyl)butyl]carbamate and oxirane-2-carbonyl-N-[4-(triethoxysilyl)butyl]carbamate In certain embodiments, optionally in combination with one or more features of the various embodiments described above or below, the radical A is selected from those compounds of formula (VI) as described above.

In one embodiment, optionally in combination with one or more features of the various embodiments described above or below, the radical A is selected from those compounds of formula (VI) wherein w is an integer selected from 1, 2, 3, or 4; particularly 2, 3 or 4;

and wherein the reaction of b) with a) is carried out in a molar ratio from 0.05 to 2.0 mole, preferably from 0.2 to 1.8 mole, more preferably from 0.50 to 1.5 mole, being particularly preferably from 0.8 to 1.2 mole of capping agent per mole of polyether polyol.

In accordance with a particular embodiment, optionally in combination with one or more features of the various embodiments described above or below, the compound of formula (I) is selected from 3-[3-(triethoxysilyl)propyl]oxolane-2,5-dione

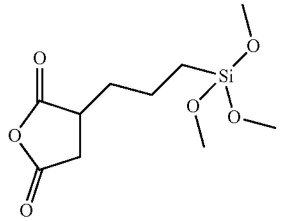 [SMILES: CO[Si](CCCC1CC(=O)OC1=O)(OC)OC]

and 3-[3-(trimethoxysilyl)propyl]oxolane-2,5-dione

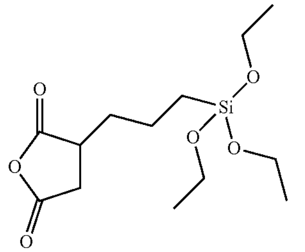 [SMILES: CCO[Si](CCCC1CC(=O)OC1=O)(OCC)OCC]

Thus, in accordance with certain embodiments, optionally in combination with one or more features of the various embodiments described above or below, the alkoxysilane group-modified compounds contains from 1 to 8 hydroxyl groups per molecule, preferably from 2 to 7, more preferably from 3 to 6 and still more preferably from 4 to 5 hydroxyl groups per molecule and from 1 to 2, preferently 1, alcoxysilane groups per molecule.

In accordance with particular embodiments, optionally in combination with one or more features of the various embodiments described above or below, such polyether polyol have a functionality from 2-9, preferably from 2-8, more preferably from 3-7; and still more preferably from 3-6. In some particular embodiments the OH functionality is 2, 3, 4, 5, 6, 7, 8 or 9.

In accordance with particular embodiments, optionally in combination with one or more features of the various embodiments described above or below, such polyether polyol have an average molecular weight from 3000 to 25000, preferably from 6000 to 20000, more preferably from 8000 to 15000, and still more preferably from 11000 to 14000.

In accordance with particular embodiments, optionally in combination with one or more features of the various embodiments described above or below, such polyether polyol have a hydroxyl number in the range 20-600 mg KOH/g, preferably 28-380 mg KOH/g, more preferably 28-80 mg KOH/g.

In accordance with particular embodiments, optionally in combination with one or more features of the various embodiments described above or below, such polyether polyol have a viscosity at 25° C. from 50 to 12500 mPa s, preferably from 200 to 8000 mPa s, more preferably from 450 to 5000 mPa s and still more preferably from 500 to 2000 mPa s.

In accordance with certain particular embodiments, optionally in combination with one or more features of the various embodiments described above or below, the polyether polyol is a polyether polyol having a functionality between 3-6; an average molecular weight from 6000 to 20000 and a viscosity at 25° C. from 200 to 8000 mPa s.

In accordance with some particular embodiments of the present invention, optionally in combination with one or more features of the various embodiments described above or below, the polyether polyol does not comprises organic fillers dispersed therein. Thus, in accordance with one embodiment, the first polyol is not or does not comprises a modified polymer polyol, since it is substantially free of organic fillers dispersed therein.

In accordance with some particular embodiments of the present invention, optionally in combination with one or more features of the various embodiments described above or below, the polyether polyol comprises quantities of organic fillers dispersed therein; thus in some embodiments, the polyether polyol may contain from 0 wt % to 50 wt % of and organic filler dispersed therein, preferably from 0.01 wt % to 30 wt %, more preferably from 0.02 wt % to 15 wt %, and still more preferably from 0.5 wt % to 5 wt %. Example of organic fillers are polyethylene, polypropylene, and vinyl polymer particles such as particles of acrylonitrile, polystyrene, methacrylonitrile, methyl methacrylate, and styrene-acrylonitrile.

In accordance with some particular embodiments of the present invention, optionally in combination with one or more features of the various embodiments described above or below, the polyether polyol is a poly(ethylene oxide and/or propylene oxide) adduct of one of the following polyhydric alcohols: glycerol, sorbitol, trimethylolpropane, diethylene glycol, butanetriol, pentanetriol, hexanetriol and tetaerythriol.

In accordance with particular embodiments, optionally in combination with one or more features of the various embodiments described above or below, the polyether polyol is a ethylene oxide (EO) or propylene oxide (PO) capped polyether polyol. In a particular embodiment, optionally in combination with one or more features of the various embodiments described above or below, the polyether polyol is a reactive polyether polyol, i.e. an ethylene oxide (EO) capped polyether polyol having a content of terminal primary hydroxyl groups, as measured by RMN-13C, from 35 to 99.9%, from 35 to 98%, from 40 to 95%, from 45 to 90%, from 50 to 85%, from 75 to 99%, from 77 to 98% or from 78 to 95%. In accordance with some particular embodiments, optionally in combination with one or more features of the various embodiments described above or below, the polyether polyol is a reactive polyether polyol having a content of polyethylene oxide terminal blocks of 5-20 wt %, preferably 10-19.5 wt %, preferably from 12-19 wt % and more preferably from 13-18 wt %.

In accordance with another particular embodiment, optionally in combination with one or more features of the various embodiments described above or below, the polyether polyol is a non-reactive polyether polyol, i.e. a propylene oxide (PO) capped polyether polyol.

In some particular embodiments of the present invention, optionally in combination with one or more features of the various embodiments described above or below, the polyether polyol is a poly(ethylene oxide and/or propylene oxide) adduct of a polyhydric alcohol selected from glycerol, sorbitol, trimethylolpropane, diethylene glycol, butanetriol, pentanetriol, hexanetriol and tetaerythriol; wherein the polyether polyol has a functionality from 2-9, an average molecular weight from 6000 to 20000.

In some particular embodiments of the present invention, optionally in combination with one or more features of the various embodiments described above or below, the alkoxysilane group-modified compounds are obtained by reacting a) at least a polyether polyol having a functionality from 2 to 9 and an average molecular weight from 6000 to 20000, which is obtainable by reacting ethylene oxide and/or propylene oxide with a polyhydric alcohol selected from glycerol, sorbitol, trimethylolpropane, diethylene glycol, butanetriol, pentanetriol, hexanetriol and tetaerythriol; with b) at least a capping alkoxysilane group-containing agent which is a compound of formula (I) wherein the radical A is selected from those compounds of formula (II) wherein m is an integer from 1 to 6; and R4 is selected from —NCO,

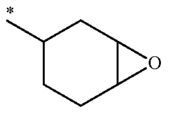

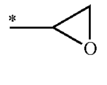

wherein the asterisk indicates the point of attachment to the rest of group;

those compounds of formula (III) wherein n and p are independently an integer selected from 1 to 6, q is an integer selected from 1 to 3, X is selected from —O— and —N(R5)—, wherein R5 is a radical selected from H, linear or branched (C1-C6)alkyl,

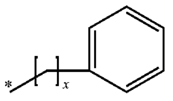

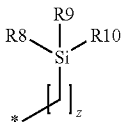

wherein the asterisk indicates the point of attachment to the N atom; x and z are independently an integer selected from 1 to 6; and R8, R9 and R10 are each independently selected from $—CH_3$, $—CH_2CH_3$, $—OCH_3$, $—OCH_2CH_3$, $—O—Si(CH_3)_3$, and $—O—Si(CH_2CH_3)_3$, those compounds of formula (IV) or (V) wherein r and t are independently an integer selected from 1 to 4; and s is an integer selected from 1 to 3;

or alternatively those compounds of formula (VI), wherein w is an integer selected from 1 to 4, such as 3-[3-(triethoxysilyl)propyl]oxolane-2,5-dione and 3-[3-(trimethoxysilyl)propyl]oxolane-2,5-dione and wherein the reaction of b) with a) is carried out in a molar ratio from 0.05 to 2.0 mole, preferably from 0.2 to 1.8 mole, more preferably from 0.50 to 1.5 mole, being particularly preferably from 0.8 to 1.2 mole of capping agent (of formula (I)) per mole of polyether polyol.

In some particular embodiments of the present invention, optionally in combination with one or more features of the various embodiments described above or below, the alkoxysilane group-modified compounds are obtainable by reacting a) at least a polyether polyol having a functionality from 2 to 9, and an average molecular weight from 3000 to 25000 as defined above; with b) at least a capping alkoxysilane group-containing agent of formula (I) which is selected from (3-isocyanatopropyl)trimethoxysilane, (3-isocyanatopropyl)dimethoxy(methyl)silane, (3-isocyanatopropyl)(methoxy)dimethylsilane, (3-isocyanatopropyl)dimethoxyethylsilane, 3-isocyanatopropyltriethoxysilane, (3-isocyanatopropyl)diethoxy(ethyl)silane, triethoxy(2-isocyanatoethyl)silane, triethoxy(isocyanatomethyl)silane, trimethoxy({3-[(oxiran-2-yl)methoxy]propyl})silane, dimethoxy(methyl){3-[(oxiran-2-yl)methoxy]propyl}silane, methoxydimethyl{3-[(oxiran-2-yl)methoxy]propyl}silane, dimethoxy(ethyl){3-[(oxiran-2-yl)methoxy]propyl}silane, triethoxy({3-[(oxiran-2-yl)methoxy]propyl})silane, diethoxy-ethyl-[3-(oxiran-2-ylmethoxy)propyl]silane, 3-(trimethoxysilyl)-N-(3-(trimethoxysilyl)propyl)-N-((oxiran-2-yl)methyl)propan-1-amine, 3-(triethoxysilyl)-N-(3-(triethoxysilyl)propyl)-N-((oxiran-2-yl)methyl)propan-1-amine, N,N-bis((trimethoxysilyl)methyl)(oxiran-2-yl)methanamine, 3-trimethoxysilylpropylcarbamoyl oxirane-2-carboxylate, 3-triethoxysilylpropylcarbamoyl oxirane-2-carboxylate, 3-trimethoxysilylethylcarbamoyl oxirane-2-carboxylate, and 3-triethoxysilylethylcarbamoyl oxirane-2-carboxylate, and wherein the reaction of b) with a) is carried out in a molar ratio from 0.05 to 2.0 mole, preferably from 0.2 to 1.8 mole, more preferably from 0.50 to 1.5 mole, being particularly preferably from 0.8 to 1.2 mole of capping agent per mole of polyether polyol.

Thus, since the new alkoxysilane group-modified compounds according to the present invention are obtainable by reaction of at least a polyether polyol as defined above with the at least one compound of formula (I), the new alkoxysilane group-modified compounds may be described as capped polyether polyols wherein from 1 to 2, preferably 1 hydroxyl groups of the polyether polyol are reacted with the hydroxyl-reactive group present in the capping alkoxysilane group-containing agent. In accordance with some particular embodiments, the hydroxyl-reactive group is a NCO or a epoxy group. Thus, for example, when a polyether polyol having a functionality of 6, i.e. the number of OH groups in the molecule is 6, reacts with the compound of formula (I) in a molar ratio from 0.8 to 1.2 mole of compound of formula (I) per mole of polyether polyol, the alkoxysilane group-modified compound thus obtained is a polyether polyol wherein 1 hydroxyl groups have reacted with the hydroxyl-reactive group present in the capping alkoxysilane group—containing agent of formula (I), leaving the other hydroxyl groups free.

In accordance with one embodiment, optionally in combination with one or more features of the various embodiments described above or below, the reaction between a) the polyether polyol and b) the compound of formula (I) is carried out in a temperature range from 0° C. to 160° C., preferably from 10° C. to 120° C., particularly preferred from 20° C. to 80° C.

This reaction may be carried out in the presence of a catalyst. The skilled person in the art may identify any suitable catalyst depending on the reactants.

In some embodiments, optionally in combination with one or more features of the various embodiments described above or below, the reaction may be carried out in the presence of urethanization catalysts known to experts per se, such as potassium-based catalyts, organotin compounds or amine catalysts. Other catalysts such as Zinc based catalysts may be used. In some particular embodiments, optionally in combination with one or more features of the various embodiments described above or below, the potassium-based catalys is selected from potassium acetate and potassium octoate; the organitin catalyst is selected from dibutyl tin diacetate, dibutyl tin dilaurate, dioctyl tin dilaurate, dibutyl tin bis acetoacetonate, tin carboxylates such as tin octoate, tin Ricinoleate, tin neodecanoate; whereas the amine catalysts is selected from tertiary amines. In some embodiments, the reaction is carried out in the presence of at least one tin catalyst or at least one amino catalyst.

In another embodiments, optionally in combination with one or more features of the various embodiments described above or below, particularly when the compound of formula (I) have an epoxide group as the hydroxyl-reactive group, the reaction may be carried out in the presence of a catalyst selected from Lewis acids and Brönstedt superacids such as $BF_3$, $PF_5$, $SbF_5$, $HPF_6$, $HBF_4$, $HSbF_6$, $CF_3SO_3H$, $Al(CF_3SO_3)_3$, $Y(CF_3SO_3)_3$, $Nd(CF_3SO_3)_3$, anionic catalyst such as NaOH, KOH, CsOH, $Sr(OH)_2$, $Ba(OH)_2$, calcium naphthenates, calcium octanoates, phosphazenium compounds; co-ordinative catalysts such as aluminium and zinc alkyls and alcoholates [$Al(OR)_3$, $Zn(OR)_2$], aluminium and zinc tetraphenyl porphirinates, titanium alcoholates [$Ti(OR)_4$], dimetallic catalysts (DMC) based on $Zn_3[Co(CN)_6]_3$.

The reaction may be carried out continuously, e.g. in a static mixer or in a extruder, or discontinuously, e.g. in a stirred reactor.

The present invention also relates to new stable modified polymer polyol dispersions obtainable by polymerising one or more polymeric particle precursors in a liquid polyol mixture under polymerisation conditions characterised in that the liquid polyol mixture comprises at least one base polyol and at least one alkoxysilane group-modified compound as defined herein.

With regard to the base polyol used in the preparation of the modified polymer polyol dispersions and/or the polyurethane foams according to the present invention, this base polyol may be of any suitable kind known in the art.

Representative base polyols useful in the preparation of the modified polymer polyol in accordance with the present disclosure may include any kind of polyol that is known in the art and includes those described herein and any other commercially available polyol. Reperesentative polyols include polyether polyols, polyester polyols, polymer polyols, polyhydroxy-terminated acetal resins, hydroxyl-terminated amines, polyalkylene carbonate-based polyols, acrylic polyols, polyphosphate-based polyols, and polyols comprising a polyether carbonate polyol (POPC). Suitable polymer polyols include PDH polyols, PIPA polyols, SAN polyols, copolymer polyols and polymer polyols comprising a polyether carbonate polyol (POPC) as the base polyol. All types of other polyols like polyols derived from renewable resources (so called natural oil polyols or NOP's) can also be used pure or in mixtures as long as they have the right physico—chemical features.

In accordance with an embodiment, optionally in combination with one or more features of the various embodiments described above or below, preferred base polyols are selected from polyether polyols, PDH polyols, PIPA polyols, SAN polyols, and polyols comprising a polyether carbonate polyol (POPC). Some particularly preferred base polyols are selected from polyether carbonate polyols (POPC) and polyether polyols.

In one preferred embodiment, optionally in combination with one or more features of the various embodiments described above or below, the base polyol comprises at least one ethylene oxide (EO) or propylene oxide (PO) capped polyether polyol.

In accordance with one particular embodiment, optionally in combination with one or more features of the various embodiments described above or below, suitable base polyols may have an OH functionality from 2 to 10, in other particular embodiments the OH functionality is from 2 to 8, more particularly from 2 to 6, even more particularly from 3 to 6. In some particular embodiments the OH functionality is 2, 3, 4, 5, 6, 7, 8, 9 or 10.

In accordance with one particular embodiment, optionally in combination with one or more features of the various embodiments described above or below, suitable base polyols are reactive polyether polyols, i.e. ethylene oxide (EO) capped polyether polyol having a content of terminal primary hydroxyl groups between 35-99.9%, as measured by RMN-13C,from 35 to 99.9%, from 35 to 98%, from 40 to 95%, from 45 to 90%, from 50 to 85%, from 75 to 99%, from 77 to 98% or from 78 to 95%. In accordance with some particular embodiments, optionally in combination with one or more features of the various embodiments described above or below, the base polyol is a reactive polyether polyol having a content of polyethylene oxide terminal blocks of 5-20 wt %, preferably 10-19.5 wt %, preferrably from 12-19 wt % and more preferably from 13-18 wt %.

In accordance with another particular embodiment, optionally in combination with one or more features of the various embodiments described above or below, the base polyol is a non-reactive polyether polyol.

In some embodiments, optionally in combination with one or more features of the various embodiments described above or below, the base polyols have a molecular weight (MW) in the range of 150 to 12000; preferably 200 to 11500 and more preferably from 250 to 10500. Some base polyols according to the invention have a molecular weight (MW) in the range from 300 to 4000, particularly from 350 to 2000, more particularly from 400 to 1000. In other particular embodiments, optionally in combination with one or more features of the various embodiments described above or below, the base polyols may have a MW in the range from 3000 to 12000, particularly in the range from 4500 to 12000, more particularly from 4600 to 10000, or even more particularly from 5000 to 9000. Some particular embodiments, optionally in combination with one or more features of the various embodiments described above or below, refer to base polyols having a molecular weight (MW) in the range from 400 to 3000; alternatively in certain particular embodiments the base polyols have a molecular weight in the range from 4500 to 12000.

In some embodiments, optionally in combination with one or more features of the various embodiments described above or below, the base polyols have a viscosity at 25° C. from 50 to 25000 mPa s, preferably from 65 to 9500 and more preferably from 150 to 8000 mPa s. In some embodiments, optionally in combination with one or more features of the various embodiments described above or below, the base polyols have a viscosity at 25° C. from 250 to 6500 mPa s, particularly from 400 to 2000 mPa s, from 420 to 1800 mPa s, from 450 to 1600 mPa s, from 470 to 1500 mPa s.

In certain embodiments, optionally in combination with one or more features of the various embodiments described above or below, the hydroxyl number (iOH) of the base polyols ranges from 5 to 1800 mg KOH/g, from 5 to 1500 mg KOH/g, from 7 to 1400 mg KOH/g, from 8 to 1300 mg KOH/g, from 9 to 1200 mg KOH/g, or from 10 to 1100 mg KOH/g. In other embodiments the iOH of the base polyols ranges from 5 to 800 mg KOH/g, from 10 to 600 mg KOH/g, from 15 to 500 mg KOH/g, from 25 to 460 mg KOH/g. In certain particular embodiments the iOH of the base polyols ranges from 20 to 80 mg KOH/g, from 25 to 70 mg KOH/g, from 26 to 65 mg KOH/g or 26 to 58 mg KOH/g. Whereas in certain embodiments, the iOH of the base polyols ranges from 80 to 700 mg KOH/g, from 81 to 650 mg KOH/g, from 90 to 550 mg KOH/g, from 120 to 520 mg KOH/g. In some examples the iOH of the base polyols ranges from 28-280 mg KOH/g; in accordance with additional examples the iOH ranges from 28-56 mg KOH/g and in further examples the iOH ranges from 160-490 mg KOH/g.

It is well known in the art to use mixed polyols to vary the reactivity of the system or impart desired properties to the resulting polyurethanes. Therefore, in accordance with an embodiment of the present disclosure, optionally in combination with one or more features of the various embodiments described above or below, mixtures of base polyols, mixtures of polymer polyols or mixtures of base and polymer polyols may also be used.

In accordance with some embodiments, optionally in combination with one or more features of the various embodiments described above or below, the modified polymeric polyol dispersions are obtained using as polymeric particle precursors the at least one co-reactant having at least one hydrogen attached to a nitrogen or oxygen atom b.1) and the at least one polyisocyanate as disclosed above.

In those embodiments wherein the polymeric particle precursor is as defined in b.1), i.e. at least one of a co-reactant having an equivalent weight of up to 400 and at least one active hydrogen attached to a nitrogen or oxygen atom, then the modified polymer polyol dispersion thus obtained is a PIPA polyol or a PHD polyol. Thus, in accordance with some embodiments, optionally in combination with one or more features of the various embodiments described above or below, the at least one of a co-reactant having an equivalent weight of up 400 and at least one active hydrogen attached to a nitrogen group is used.

If a PHD polymer polyol is desired, the PHD forming co-reactants may include amines, such as ammonia, anilines and substituted anilines, and fatty amines. The PHD forming co-reactants may also include diamines, such as ethylenediamine, 1,6-hexamethylenediamine, alkonolamines, and hydrazine.

If a PIPA polymer polyol is desired, the PIPA forming co-reactants may include diols, such as diethylene glycol, triethylene glycol, and polyethyelene glycol; and alkanolamines, such as monoethanolamine, diethanolamine, triethanolamine, triisopropanolamine, 2-(2-aminoethoxyethanol), hydroxyethylpiperazine, monoisopropanolamine, diisopropanolamine and mixtures thereof. Other alkanolamines which may be considered include N-methylethanolamine, phenylethanolamine, and glycol amine.

It is also possible to provide a mixture of PHD and PIPA forming co-reactants to form hybrid PHD-PIPA particles.

The at least one PHD and/or PIPA polymer forming co-reactants are added to the blend in a concentration of between about 2 wt. % and about 40 wt. % of the total polyol blend weight, preferably between about 5 wt. % and about 30 wt. %. All individual values and subranges between about 2 wt. % and about 40 wt. % are included herein and disclosed herein; for example, the solid content may be from a lower limit of 2, 3, 4, 5, 8, 10, 15, 20, 25, or 30 wt. % to an upper limit of 20, 25, 30, 35, or 40 wt. % of the weight of the polymer polyol.

In accordance with some embodiments catalytic quantities of organometallics may be used. Organometallic compounds useful as catalysts include those of bismuth, lead, tin, titanium, iron, antimony, uranium, cadmium, cobalt, thorium, aluminum, mercury, zinc, nickel, cerium, molybdenum, vanadium, copper, manganese, zirconium, chromium, etc. Some examples of these metal catalysts include bismuth nitrate, bismuth neodecanoate, lead 2-ethylhexoate, lead benzoate, lead oleate, dibutyltin dilaurate, tributyltin, butyltin trichloride, dimethyltin, dimethyltin dineodecanoate, stannic chloride, stannous octoate, stannous oleate, stannous riconoleate, dibutyltin di(2-ethylhexoate), zinc octoate, zinc riconoleate ferric chloride, antimony trichloride, antimony glycolate, tin glycolates, iron acetyl acetonate etc. The catalyst may accelerate the reaction of diisocyanate with the primary hydroxyl groups of the alkanolamines.

The at least one polyisocyanate b.2) which may be used in the present invention include aliphatic, cycloaliphatic, arylaliphatic and aromatic isocyanates.

Examples of suitable aromatic polyisocyanates include the 4,4'-, 2,4' and 2,2'-isomers of diphenylmethane diisocyante (MDI), blends thereof and polymeric and monomeric MDI blends, toluene-2,4- and 2,6-diisocyanates (TDI), m- and p-phenylenediisocyanate, chlorophenylene-2,4-diisocyanate, diphenylene-4,4'-diisocyanate, 4,4'-diisocyanate3, 3'-dimehtyldiphenyl, 3-methyldiphenyl-methane-4,4'-diisocyanate and diphenyletherdiisocyanate and 2,4,6-triisocyanatotoluene and 2,4,4'-triisocyanatodiphenylether. Mixtures of polyisocyanates may be used, such as the commercially available mixtures of 2,4- and 2,6-isomers of toluene diisocyanates. A crude polyisocyanate may also be used in the practice of this invention, such as crude toluene diisocyanate obtained by the phosgenation of a mixture of toluene diamine or the crude diphenylmethane diisocyanate obtained by the phosgenation of crude methylene diphenylamine. TDI/MDI blends may also be used. Examples of aliphatic polyisocyanates include ethylene diisocyanate, 1,6-hexamethylene diisocyanate, isophorone diisocyanate, cyclohexane 1,4-diisocyanate, 4,4'-dicyclohexylmethane diisocyanate, saturated analogues of the above mentioned aromatic polyisocyanates and mixtures thereof.

In accordance with certain embodiments, optionally in combination with one or more features of the various embodiments described above or below, the mixture of compounds bearing a phosphorus atom a.2) comprises:

I. [bis(hydroxymethyl)phosphanyl]methanol (THP) in a concentration from 0-99.9 mol %, from 20-95 mol %, from 30-90 mol %; from 35-85 mol %, from 50-75 mol % or from 60-72 mol %;

II. a tetrakis(hydroxymethyl) phosphonium salt (THPX) in a concentration from 0-50 mol %, from 0-30 mol %, from 0.05-15 mol %, from 0.1-10 mol %, from 0.1-7.5 mol %, from 0.2-5 mol %, or from 0,5-6.6 mol % THPX;

III. [bis(hydroxymethyl)phosphoryl]methanol (THPO) in a concentration from 0-99.9 mol %, from 0-40 mol %, from 1-15 mol %, from 2-12 mol %, or from 2-7 mol % THPO;

IV. {[bis(hydroxymethyl)phosphanyl]methoxy}methanol (mTHP) in a concentration from 0-80 mol %, from 0.1-60 mol %, from 0.2-45 mol %, from 0.4-40 mol %, from 0.5-30 mol %, or from 1-25 mol % mTHP;

V. {bis[(hydroxymethoxy)methyl]phosphanyl}methanol (dTHP) in a concentration from 0-30 mol %, from 0.1-20 mol %, from 0.2-15 mol % or from 0.25-10 mol % dTHP;

VI. ({bis[(hydroxymethoxy)methyl]phosphanyl} methoxy)methanol (tTHP) in a concentration from 0-15 mol %, from 0.05-5 mol %, from 0.075-2 mol %, or from 0.1-1 mol % tTHP;

VII. {[bis(hydroxymethyl)phosphoryl]methoxy} methanol (mTHPO) in a concentration from 0-20 mol %, from 0.05-10 mol %, from 0.1-6.5 mol %, from 0-6.1 mol % mTHPO;

VIII. {bis[(hydroxymethoxy)methyl]phosphoryl} methanol (dTHPO) in a concentration from 0-10 mol %, from 0.05-5 mol %, from 0.1-1 mol % dTHPO; and IX. ({bis[(hydroxymethoxy)methyl]phosphoryl} methoxy)methanol (tTHPO) in a concentration from 0-4 mol %, from 0.01-1 mol %, from 0.05-0.2 mol %, from 0-0.5 mol % tTHPO;

X. optionally at least one other compound bearing a phosphorus atom;

being the sum total of compounds bearing a phosphorus atom in the mixture 100 mol %.

In accordance with some embodiments, optionally in combination with one or more features of the various embodiments described above or below, the mixture of compounds bearing a phosphorus atom comprises a tetrakis (hydroxymethyl)phosphonium salt (THPX) in a concentration from 0-50 mol %; wherein the countercation (X) of the salt is a monovalent, bivalent or trivalent ligand selected from chloride, bromide, iodide, sulphate, phosphate, hydrogen phosphate, dihydrogen phosphate, hydroxyde, acetate, oxalate and citrate.

In certain embodiments, optionally in combination with one or more features of the various embodiments described above or below, the hydroxyalkylphosphonium salt is selected from: tetrakis(hydroxymethyl)phosphonium chloride (THPC), bis[tetrakis(hydroxymethyl)phosphonium]sulphate (THPS), tetrakis(hydroxymethyl)phosphonium phosphate (THPP (3:1)), tetrakis(Hydroxymethyl)phosphonium monohydrogen phosphate (THPP (2:1)), tetrakis(Hydroxymethyl)phosphonium dihydrogen phosphate (THPP (1:1)), tetrakis(hydroxymethyl)phosphonium hydroxide (THPOH), tetrakis(hydroxymethyl)phosphonium oxalate (THPOx) and tetrakis(hydroxymethyl)phosphonium acetate (THPA).

Particular examples of hydroxyalkylphosphonium salts are tetrakis(hydroxymethyl) phosphonium chloride (THPC) and bis[tetrakis(hydroxymethyl)phosphonium]sulphate (THPS).

In the event that a hydroxyalkylphasphonium salt is used, it may be necessary to treat it with a base in order to obtain the corresponding hydroxyalkylphosphine. The base may be an organic or an inorganic base; preferably selected from KOH, NaOH, $Ca(OH)_2$, $Mg(OH)_2$, $Ba(OH)_2$, triethylamine ($NEt_3$), tributylamine ($NBu_3$). Alternatively, the hydroxyalkylphosphonium salt may be treated with a basic ion-exchange resin. Both, strong and weak ion exchange resins are suitable for the process. Examples of strong bases would be Amberlite® IRN78 or Amberlist® A26. Examples of weak bases would be Amberlite® IRA 67, Lewatit® MP-62 and Lewatit® VP 001065.

As mentioned above, when the hydroxyalkylphosphonium salt is reacted with a base, there may be obtained the corresponding hydroxyalkylphosphine, the corresponding salt, the corresponding aldehyde and water, whereas other phosphorus compounds may appear as reaction products. THPO is usually obtained as co-product together with THP. Besides, THP and THPO may react with formaldehyde forming the corresponding hemiformals. Mono, di and tri-substituted hemiformals of THP and THPO may be found as reaction products.

Generally, it may be desirable to reduce the formaldehyde content in the modified polyol used in the preparation of polyurethane materials. Nevertheless, it has been observed that when the formaldehyde content is reduced, e.g. by distilling it off together with the solvent and volatiles in the mixture of phosphorus compounds, and the resulting mixture is used in the preparation of the modified polymer polyols according to the method described in WO2019008140, the resulting polymeric particles may agglomerate and precipitate, resulting in a non-stable dispersion. The alkoxysilane group-modified compounds of the present disclosure are useful for dispersing and stabilizing those modified polymer polyol dispersions which are useful for the preparation of polyurethane materials showing a reduced formaldehyde release.

In one embodiment of the present invention, optionally in combination with one or more features of the various embodiments described above or below, examples of suitable compounds a.1) bearing at least one basic-nitrogen atom characterized by the presence in the molecule of at least one hydrogen atom attached to a nitrogen atom are selected from melamine, trimethylol melamine, those compounds of formula (VII) or formula (VIII) as defined above, and mixtures thereof.

In accordance with some particular embodiments, optionally in combination with one or more features of the various embodiments described above or below, the compounds of formula (VII) are those wherein R1 is selected from H, methyl, —CN, $CH_3$—CO—, $NH_2$—CO—.

In another particular embodiments, optionally in combination with one or more features of the various embodiments described above or below, compounds bearing at least one basic-nitrogen atom are those of formula (VIII) wherein R2 is selected from O═C<, S═C<, and R3 es H.

Particular examples of compounds bearing at least one basic-nitrogen atom characterized by the presence in the molecule of at least one hydrogen atom attached to a nitrogen atom are $NH_3$, primary aliphatic and alicyclic amines, aliphatic and alicyclic primary and secondary polyamines and aromatic primary, secondary and tertiary amines and polyamines, for example, cyanamide, guanidine, 2-cyanoguanidine, methylamine, ethylene diamine, diethylenetriamine, hexamethylendiamine, hydrazine, tertiary octylamine, cyclohexylamine, trimethylol melamine, urea, tiourea, aniline, and polyethyleneimines. $NH_3$, cyanamide, melamine, urea, thiourea, diethylentriamine, hydrazine and ethylene diamine are particular preferred examples.

The skilled person in the art may know the method and the suitable media in order to solubilize, if necessary, the compound bearing at least one basic-nitrogen atom.

In certain embodiments, optionally in combination with one or more features of the various embodiments described above or below, the process for the preparation of the modified polymer polyol dispersions comprises i) mixing at least one base polyol with the at least one alkoxysilane group-modified compound as defined above, thus obtaining a liquid polyol mixture;

ii) adding to the liquid polyol mixture obtained in i) simultaneously or sequentially, in any order the at least one compound bearing at least one basic-nitrogen atom a.1) characterized by the presence in the molecule of at least one hydrogen atom attached to a nitrogen atom as defined above; and either the mixture of compounds bearing a phosphorus atom a.2) comprising I. [bis(hydroxymethyl)phosphanyl]methanol (THP) in a concentration from 0-99.9 mol %, from 20-95 mol %, from 30-90 mol %; from 35-85 mol %, from 50-75 mol % or from 60-72 mol %;

II. a tetrakis(hydroxymethyl) phosphonium salt (THPX) in a concentration from 0-50 mol %, from 0-30 mol %, from 0.05-15 mol %, from 0.1-10 mol %, from 0.1-7.5 mol %, from 0.2-5 mol %, or from 0,5-6.6 mol % THPX;

III. [bis(hydroxymethyl)phosphoryl]methanol (THPO) in a concentration from 0-99.9 mol %, from 0-40 mol %, from 1-15 mol %, from 2-12 mol %, or from 2-7 mol % THPO;

IV. {[bis(hydroxymethyl)phosphanyl]methoxy}methanol (mTHP) in a concentration from 0-80 mol %, from 0.1-60 mol %, from 0.2-45 mol %, from 0.4-40 mol %, from 0.5-30 mol %, or from 1-25 mol % mTHP;

V. {bis[(hydroxymethoxy)methyl]phosphanyl}methanol (dTHP) in a concentration from 0-30 mol %, from 0.1-20 mol %, from 0.2-15 mol % or from 0.25-10 mol % dTHP;

VI. ({bis[(hydroxymethoxy)methyl]phosphanyl}methoxy)methanol (tTHP) in a concentration from 0-15 mol %, from 0.05-5 mol %, from 0.075-2 mol %, or from 0.1-1 mol % tTHP;

VII. bis(hydroxymethyl)phosphorylmethoxymethanol (mTHPO) in a concentration from 0-20 mol %, from 0.05-10 mol %, from 0.1-6.5 mol %, from 0-6.1 mol % mTHPO;

VIII. {bis[(hydroxymethoxy)methyl]phosphoryl}methanol (dTHPO) in a concentration from 0-10 mol %, from 0.05-5 mol %, from 0.1-1 mol % dTHPO; and IX. ({bis[(hydroxymethoxy)methyl]phosphoryl}methoxy)methanol (tTHPO) in a concentration from 0-4 mol %, from 0.01-1 mol %, from 0.05-0.2 mol % tTHPO;

X. optionally at least one other compound bearing a phosphorus atom;

being the sum total of compounds bearing a phosphorus atom in the mixture 100 mol %;

or the mixture of condensation products a.3) resulting from the reaction of the mixture a.2) as described above and at least one compound bearing at least one basic nitrogen atom a.1);

wherein the compound bearing at least one basic-nitrogen atom a.1) is selected from melamine, trimethylol melamine, those compounds of formula (VII) or formula (VIII) as defined above, and mixtures thereof.

In accordance with certain particular embodiments, optionally in combination with one or more features of the various embodiments described above or below, the process for the preparation of the modified polymer polyols comprises i) mixing at least one base polyol with the at least one alkoxysilane group-modified compound as defined above, thus obtaining a liquid polyol mixture;

ii) adding to the liquid polyol mixture obtained in i) simultaneously or sequentially, in any order the at least one compound bearing at least one basic-nitrogen atom a.1) which is selected from:

melamine, trimethylol melamine;

those compounds of formula (VII) wherein R1 is selected from H, methyl, —CN, $CH_3$ CO—, $NH_2$—CO—;

those compounds of formula (VIII) wherein R2 is selected from O═C<; S═C<, and R3 es H; and mixtures thereof;

and the mixture of compounds bearing a phosphorus atom a.2) which comprises:

I. [bis(hydroxymethyl)phosphanyl]metanol (THP) in a concentration from 35-85 mol %, from 50-75 mol %, or from 60-72 mol %;

II. a tetrakis(hydroxymethyl)phosphonium salt (THPX) in a concentration from 0-30 mol %, from 0.1-10 mol %, from 0.1-7.5 mol %, from 0.2-5 mol %, or from 0,5-6.6 mol %;

III. [bis(hydroxymethyl)phosphoryl]methanol (THPO) in a concentration from 0-40 mol %, from 1-15 mol %, from 2-12 mol %, or from 2-7 mol %

IV. {[bis(hydroxymethyl)phosphanyl]methoxy}methanol (mTHP) in a concentration concentration from 0-80 mol %, from 0.4-40 mol %, from 0.5-30 mol %, or from 1-25 mol %;

V. {bis[(hydroxymethoxy)methyl]phosphanyl}methanol (dTHP) in a concentration from 0-30 mol %, from 0.1-20 mol %, from 0.2-15 mol % or from 0.25-10 mol %;

VI. ({bis[(hydroxymethoxy)methyl]phosphanyl}methoxy)methanol (tTHP) in a concentration from 0-15 mol %, from 0.05-5 mol %, from 0.075-2 mol %, or from 0.1-1 mol %;

VII. bis(hydroxymethyl)phosphorylmethoxymethanol (mTHP0) in a concentration from 0-20 mol %, from 0.05-10 mol %, from 0.1-6.5 mol %, from 0-6.1 mol %;

VIII. {bis[(hydroxymethoxy)methyl]phosphoryl}methanol (dTHP0) in a concentration from 0-10 mol %, from 0.05-5 mol %, from 0.1-1 mol %; and IX. ({bis[(hydroxymethoxy)methyl]phosphoryl}methoxy)methanol (tTHPO) in a concentration from 0-4 mol %, from 0.01-1 mol %, from 0.05-0.2 mol %;

X. optionally at least one other compound bearing a phosphorus atom;

being the sum total of compounds bearing a phosphorus atom in the mixture 100 mol %.

In accordance with certain particular embodiments, optionally in combination with one or more features of the various embodiments described above or below, the preparation of the modified polymer polyols comprises i) mixing at least one base polyol with the at least one alkoxysilane group-modified compound as defined above, thus obtaining a liquid polyol mixture;

ii) adding to the liquid polyol mixture obtained in i. simultaneously or sequentially, in any order the at least one compound bearing at least one basic-nitrogen atom a.1) which is selected from:

melamine, trimethylol melamine;

those compounds of formula (VII) wherein R1 is selected from H, methyl, —CN, $CH_3$ CO—, $NH_2$—CO—;

those compounds of formula (VIII) wherein R2 is selected from O═C<; S═C<; and R3 is H; and mixtures thereof;

and the mixture of compounds bearing a phosphorus atom a.2) which comprises:

I. [bis(hydroxymethyl)phosphanyl]methanol (THP) in a concentration from 35-85 mol %

II. a tetrakis(hydroxymethyl) phosphonium salt (THPX) in a concentration from 0.5-6.6 mol %;

III. [bis(hydroxymethyl)phosphoryl]methanol (THPO) in a concentration from 2-12 mol %;

IV. {[bis(hydroxymethyl)phosphanyl]methoxy}methanol (mTHP) in a concentration from 1-25 mol %;

V. {bis[(hydroxymethoxy)methyl]phosphanyl}methanol (dTHP) in a concentration from 0.25-10 mol %;

VI. ({bis[(hydroxymethoxy)methyl]phosphanyl}methoxy)methanol (tTHP) in a concentration from 0-15 mol %;

VII. bis(hydroxymethyl)phosphorylmethoxymethanol (mTHPO) in a concentration from 0-20 mol %;

VIII. {bis[(hydroxymethoxy)methyl]phosphoryl}methanol (dTHPO) in a concentration from 0-10 mol %; and IX. ({bis[(hydroxymethoxy)methyl]phosphoryl}methoxy)methanol (tTHPO) in a concentration from 0-4 mol %;

X. optionally at least one other compound bearing a phosphorus atom;

being the sum total of compounds bearing a phosphorus atom in the mixture 100 mol %.

In accordance with some embodiments, optionally in combination with one or more features of the various embodiments described above or below, the preparation of the modified polymer polyols comprises:

i. mixing at least one tetrakis(hydroxymethyl) phosphonium salt (THPX) with an aqueous or alcoholic solution of a base, preferably at a temperature ranging from 0° C. to 60° C.;

ii. optionally filtering out the resulting solution;

iii. distilling off the solvent and volatiles, in particular formaldehyde, thus obtaining the mixture a.2) of compounds bearing a phosphorus atom comprising [bis(hydroxymethyl)phosphanyl]metanol (THP), tetrakis(hydroxymethyl) phosphonium salt (THPX), [bis(hydroxymethyl)phosphoryl]methanol (THPO), ({[bis(hydroxymethyl)phosphanyl]methoxy}methanol (mTHP), {bis[(hydroxymethoxy)methyl]phosphanyl}methanol (dTHP), {bis[(hydroxymethoxy)methyl]phosphanyl}methoxy)methanol (tTHP), {[bis(hydroxymethyl)phosphoryl]methoxy}methanol (mTHPO), {bis[(hydroxymethoxy)methyl]phosphoryl}methanol (dTHPO) and ({bis[(hydroxymethoxy)methyl]phosphoryl}methoxy)methanol (tTHPO);

iv. optionally filtering out the resulting solution, v. optionally oxydizing the product obtained in iii or the solution obtained in iv, wherein the oxydation may be done by simply thermal treatment in air atmosphere or by the use of oxidants as, for example, water peroxide, thus obtaining the mixture a.2) with a high content of oxydized components;

vi. mixing the at least one base polyol with the at least one alkoxysilane group-modified compound as defined above, thus obtaining the liquid polyol mixture;

vii. preparing the polymeric particles in the presence of the liquid polyol mixture obtained in vi. by the reaction resulting from adding to the liquid polyol mixture obtained in vi. simultaneously or sequentially in any order the at least one compound bearing at least one basic-nitrogen atom a.1) characterized by the presence in the molecule of at least one hydrogen atom attached to a nitrogen atom and is selected from melamine, trimethylol melamine, those compounds of formula (VII) or formula (VIII) as defined above, and mixtures thereof; and the mixture of compounds bearing a phosphorus atom a.2) obtained in iii, the filtered solution obtained in iv, the oxydized mixture obtained in v, or mixtures thereof;

In accordance with certain embodiments, optionally in combination with one or more features of the various embodiments described above or below, the aqueous or alcoholic solution of a base used in step i. above may be selected from KOH, NaOH, $Ca(OH)_2$, $Mg(OH)_2$, $Ba(OH)_2$, triethylamine ($NEt_3$), tributylamine ($NBu_3$). Alternatively, the hydroxyalkylphosphonium salt may be treated with a basic ion-exchange resin. Both, strong and weak ion exchange resins are suitable for the process. Examples of strong bases would be Amberlite® IRN78 or Amberlist® A26. Examples of weak bases would be Amberlite® IRA 67, Lewatit® MP-62 and Lewatit® VP 001065.

In accordance with certain embodiments, optionally in combination with one or more features of the various embodiments described above or below, the distilling off step is performed under vacuum and at a temperature ranging from 25-99° C., preferably from 40-90° C. and more preferably from 60-80° C.

Molar ratios to be used between the phosphorus bearing compound and the compound bearing at least one basic-nitrogen atom depend on the functionality of the compound bearing at least one basic-nitrogen atom. The skilled person would know how to adjust the molar ratios in the light of the description and examples of the present invention in order to obtain a solid product.

The compound bearing at least one basic nitrogen atom may be added to the reactor as a solid, as a gas or dissolved in a suitable solvent. Aqueous solutions of amines are preferred.

The reaction can be carried out at atmospheric pressure, vacuum or under pressure. Besides, the reaction can be carried out under inert (nitrogen, argon) or oxidant atmosphere (air).

Stirring must be vigorous in order to guarantee the formation of particles and to avoid agglomeration of the products.

With regard to the specific conditions for carrying out the process of the invention, the skilled person would know how to adjust the parameters of each of the steps indicated above in the light of the description and examples of the present invention.

In certain embodiments, optionally in combination with one or more features of the various embodiments described above or below, the process for the preparation of the modified polymer polyol dispersions comprises i) mixing at least one base polyol with the at least one alkoxysilane group-modified compound as defined above, thus obtaining a liquid polyol mixture;
ii) adding to the liquid polyol mixture obtained in i. simultaneously or sequentially, in any order
 the at least one compound bearing at least one basic-nitrogen atom a.1) characterized by the presence in the molecule of at least one hydrogen atom attached to a nitrogen atom as defined above; and
 the mixture of condensation products a.3) as defined above.

The condensation products a.3) resulting from the reaction of the mixture a.2) and at least one compound bearing at least one basic nitrogen atom a.1) which is selected from melamine, trimethylol melamine, those compounds of formula (VII) or formula (VIII) as described above, and mixtures thereof; wherein the condensation reaction is carried out at a temperature ranging from 2-140° C., preferably from 25-120° C., more preferably from 40-100° C., being particularly preferably from 60-90° C. The skilled person in the art may know how to adjust the temperature conditions in view of the compound a.1) used in the method.

In accordance with certain particular embodiments, optionally in combination with one or more features of the various embodiments described above or below, the preparation of the modified polymer polyols comprises i) mixing at least one base polyol with the at least one alkoxysilane group-modified compound as defined above, thus obtaining a liquid polyol mixture;
ii) adding to the liquid polyol mixture obtained in i. simultaneously or sequentially, in any order
 the at least one compound bearing at least one basic-nitrogen atom a.1) which is selected from:
  melamine, trimethylol melamine
  those compounds of formula (VII) wherein R1 is selected from H, methyl, —CN, $CH_3$ CO—, $NH_2$—CO—;
  those compounds of formula (VIII) wherein R2 is selected from O═C<; S═C<; and R3 es H; and mixtures thereof
 and
 the mixture of condensation products a.3) obtainable at a temperature ranging from 2-140° C., preferably from 25-120° C., more preferably from 40-100° C., being particularly preferably from 60-90° C.

In accordance with certain particular embodiments, optionally in combination with one or more features of the various embodiments described above or below, the preparation of the modified polymer polyols comprises i) mixing at least one base polyol with the at least one alkoxysilane group-modified compound as defined above, thus obtaining a liquid polyol mixture;
ii) adding to the liquid polyol mixture obtained in i. simultaneously or sequentially, in any order
 the at least one compound bearing at least one basic-nitrogen atom a.1) which is selected from:
  melamine, trimethylol melamine,
  those compounds of formula (VII) wherein R1 is selected from H, methyl, —CN, $CH_3$ CO—, $NH_2$—CO—;
  those compounds of formula (VIII) wherein R2 is selected from O═C<; S═C<; and R3 es H; and
  mixtures thereof;
 and
 the mixture of condensation products a.3) obtainable at a temperature ranging from 2-140° C., preferably from 25-120° C., more preferably from 40-100° C., being particularly preferably from 60-90° C.

In accordance with some embodiments, optionally in combination with one or more features of the various embodiments described above or below, the preparation of the modified polymer polyols comprises:

i) mixing at least one tetrakis(hydroxymethyl) phosphonium salt (THPX) with an aqueous or alcoholic solution of a base, preferably at a temperature ranging from 0° C. to 60° C.;
ii) optionally filtering out the resulting solution;
iii) distilling off the solvent and volatiles, thus obtaining the mixture a.2) of compounds bearing a phosphorus atom as defined above,
iv) optionally filtering out the resulting solution;
v) optionally oxydizing the product obtained in iii or the solution obtained in iv, wherein the oxidation may be performed by simple by thermal treatment in air atmosphere or by the use of oxidants as, for example, water peroxide, thus obtaining the mixture a.2) with a high content of oxydized components;
vi) reacting the mixture of compounds a.2) as obtained in iii), the filtered solution obtained in iv), the oxidized mixture as obtained in v) or mixtures thereof with at least one compound bearing at least one basic-nitrogen atom a.1) characterized by the presence in the molecule of at least one hydrogen atom attached to a nitrogen atom and is selected from melamine, trimethylol melamine, those compounds of formula (VII) or formula (VIII) as defined above, and mixtures thereof; preferably at a temperature ranging from 2 to 140° C., preferably from 25 to 120° C., more preferably from 40 to 100° C., and most preferably from 60 to 90° C. thus obtaining a mixture of condensation products a.3);
vii) mixing the at least one base polyol with the at least one alkoxysilane group-modified compound as defined above, thus obtaining a liquid polyol mixture;
viii) preparing the polymeric particles in the presence of the liquid polyol mixture obtained in vii) by the reaction resulting from adding to the liquid polyol mixture obtained in vii), simultaneously or sequentially in any order
 the at least one compound bearing at least one basic-nitrogen atom a.1) characterized by the presence in the molecule of at least one hydrogen atom attached to a nitrogen atom which is selected from melamine, trimethylol melamine, those compounds of formula (VII) or formula (VIII) as defined above, and mixtures thereof; and the mixture of condensation products a.3) obtained in vi).

In accordance with some particular embodiments, optionally in combination with one or more features of the various embodiments described above or below, the aqueous or alcoholic solution of a base used in step i) above is selected from KOH, NaOH, $Ca(OH)_2$, $Mg(OH)_2$, $Ba(OH)_2$, triethylamine ($NEt_3$), tributylamine ($NBu_3$). Alternatively, the hydroxyalkylphosphonium salt may be treated with a basic ion-exchange resin. Both, strong and weak ion exchange resins are suitable for the process. Examples of strong bases would be Amberlite® IRN78 or Amberlist° A26. Examples of weak bases would be Amberlite® IRA 67, Lewatit° MP-62 and Lewatit® VP 001065.

In accordance with certain particular embodiments, optionally in combination with one or more features of the various embodiments described above or below, the condensation products resulting from the reaction of the mixture a.2) as obtained in step iii), the filtered solution obtained in iv), the oxydized mixture as obtained in step v or mixtures thereof, and the at least one compound bearing at least one basic nitrogen atom a.1) which is selected from melamine, trimethylol melamine, those compounds of formula (VII) or formula (VIII) as described above, and mixtures thereof, are obtainable at a temperature ranging from 2 to 140° C., preferably from 25 to 120° C., more preferably from 40 to 100° C., and most preferably from 60 to 90° C. The skilled person in the art would know how to adjust the temperature and reaction time in the light of the description and examples herein described in order to complete the condensation reaction.

The stable modified polymer polyol dispersion obtained according to the above mentioned methods, is a polyol which has finely dispersed particles of a polymer with high content of nitrogen and phosphorus.

In some embodiments, optionally in combination with one or more features of the various embodiments described above or below, the stable modified polymer polyol dispersion comprises from 5 wt % to 95 wt %, from 10 wt % to 90 wt %, from 15 wt % to 80 wt %, from 20 wt % to 70 wt % of dispersed polymeric particles.

Accordingly, the polymeric particles dispersed in the at least one polyol have a phosphorus content content from 0,1 to 50 wt %; preferably from 5 to 40 wt % and most preferably from 13 to 35 wt %. The polymeric particles dispersed in the at least one polyol have a nitrogen content from 0,1 to 40 wt %; preferably from 5 to 40 wt % and most preferably from 7 to 30 wt %. In conjunction the sum of the content of nitrogen and phosphorus is from 0,1 to 90 wt %; preferably from 10 to 70 wt % and most preferably from 20 to 60 wt %.

In accordance with a particular embodiment of the present disclosure, the polymeric particles dispersed in the at least one base polyol, may be further oxidized using suitable oxidizing agents such as manganate, permanganate, peroxides and molecular oxygen; preferably the oxidizing agent is molecular oxygen and/or hydrogen peroxide.

The oxidation step is performed by introducing at least one oxidizing agent in the media once the polycondensation reaction has occurred. If hydrogen peroxide is used as oxidating agent, this one may be added in aqueous solution to the modified polymer polyol containing the stable dispersion of polymeric particles in the base polyol. If molecular oxygen is used as the oxidant, the oxidation may be done bubbling air into the system once the polymeric particles are formed.

The polyol composition according to the present invention comprises polymeric particles of which at least 90% by volume has a particle size of 30 μm or less, preferably from 0.5 μm to 20 μm, more preferably from 0.6 μm to 15 μm, still more preferably from 0.8 μm to 10 μm (particle size is measured using a mastersizer 3000, from Malvern Instruments, equiped with a hydro SM dispersion accessory, using ethanol as eluent).

The particle size distribution may be trimodal, bimodal, monomodal and also different independent distributions may be found.

The polymeric modified polyols of the present disclosure are useful for the preparation of polyurethane materials such as polyurethane foams, adhesives, elastomers, sealants and coatings; being preferred those with flame retardant properties.

With regard to the specific conditions for carrying out the processes of the invention, the skilled person would know how to adjust the parameters of each of the steps indicated above in the light of the description and examples of the present invention.

In the preparation of polyurethane foams, polyisocyanates, water and additives conventionally used in the manufacture of polyurethane foams may be used in combination with the modified polymer polyols of the present disclosure, in amounts and under reaction conditions which will vary depending on the type and desired properties of the polyurethane foam to be prepared. The skilled person knows different types of reactants, catalysts and conditions necessary to prepare polyurethane foams.

The modified polymer polyols of the present invention, due to the presence of the dispersed polymeric particles with high content of P and N, provide flame retardancy properties to the polyurethane derived from its use. Besides, the presence of the dispersed polymeric particles with high content of P and N will provide enhanced oxidative, thermal and UV stability to the polyurethane derived from its use. This enhanced stability is specially useful for polyurethane foams in which scorching and discoloration will be reduced.

Additionally, the modified polymer polyols of the present invention show a reduced formaldehyde content. Thus, when used in the preparation of polyurethane foams, the resulting foams show a low formaldehyde release.

In the preparation of polyurethane foams, polyisocyanates, water and additives conventionally used in the manufacture of polyurethane foams may be used in combination with the modified polymer polyols of the present disclosure, in amounts and under reaction conditions which will vary depending on the type and desired properties of the polyurethane foam to be prepared. The skilled person knows different types of reactants, catalysts and conditions necessary to prepare polyurethane foams.

Thus, polyisocyanates which may be used in the preparation of the polyurethane foams in combination with the modified polymer polyols of the present disclosure are well known in the art. Examples of suitable isocyanates include the 4,4'-, 2,4' and 2,2'-isomers of diphenylmethane diisocyante (MDI), blends thereof and polymeric and monomeric MDI blends, toluene-2,4- and 2,6-diisocyanates (TDI), TDI/MDI blends may also be used.

The polyisocyanate may be used at an isocyanate index of from 60 to 140, preferably from 80 to 120 and most preferably from 90 to 110. The isocyanate index is defined as the ratio of isocyanate-groups over isocyanate-reactive hydrogen atoms present in a polyurethane formulation. Thus, the isocyanate index expresses the percentage of isocyanate actually used in a formulation with respect to the amount of isocyanate theoretically required for reacting with the amount of isocyanate-reactive hydrogen used in a formulation.

The blowing agent may be selected from any blowing agent commonly known in the art. The main blowing agent is the carbon dioxide generated by the decarboxylation of the carbamic acid generated by the reaction of water with the isocyanate. Alternative blowing agents (ABA) such as liquid carbon dioxide, methylene chloride, HCFC, pentane, etc. may be used according to legislation and targeted foam properties.

The blowing agent concentration in a expandable polymer composition is preferably comprised from 0% w/w to 120% w/w relative to total expandable polymeric mixture weight; more preferably from 0% w/w to 40% w/w; yet more preferably from 0 w/w to 10% w/w.

Any known catalyst may be used, including aminic compounds, such as triethylenediamine, N-methylmorpholine, N,N-dimethylcyclohexylamine, pentamethyldiethylenetriamine, tetramethylethylenediamine, bis(dimethylaminoethyl)ether, 1-methyl-4-dimethylaminoethyl-piperazine, 3-methoxy-N- dimethylpropylamine, N-ethylmorpholine, dimethylethanolamine, N-cocomorpholine, N,N-dimethyl-N',N'-dimethyl isopropylpropylenediamine, N,N-diethyl-3-diethylamino-propylamine and dimethylbenzylamine. Metal catalyst based on tin, zinc, bismuth and other metals may be used in the foam formulations such as for example tin octoate, tin dibutyldilaurate, zinc octoate, and other similar compounds.

The amount of catalysts may vary from 0 to 4% in the formulation; preferably in the range 0 to 2%, most preferably from 0 to 1%. Another option is the use of autocatalytic polyols, based on tertiary amine initiatiors, replacing the amine catalysts, hence reducing volatile organic compounds in the foam.

Among the additional additives which may be employed in preparing polyurethane polymers are fillers (for example, talc, silica, titania, magnesia, calcium carbonate, carbon black, graphite, magnesium silicate or clays such as kaolinite and montmorillinite); flame retardants (for example, halogenated flame retardants, such as hexabromocyclododecane and brominated polymers,or phosphorus flame retardants such as triphenylphosphate, dimethyl methylphosphonate, red phosphorus or aluminium diethyl phosphinate); acid scavengers (for example, calcium stearate, magnesium oxide, zinc oxide, tetrasodium pyrophosphate or hydrotalcite); antioxidants (for example, sterically hindered phenols, phosphites and mixtures thereof), and pigments and blowing agent stabilizers. A silicone surfactant may be necessary to stabilize the foam formulation, those products are available from the main actors of the market such as EVONIK, MOMENTIVE, AIR PRODUCTS, STRUKSILON, etc.

The polyurethane foam may be prepared by any known method. Thus, for example, the polyurethane foam may be formed by the so-called prepolymer method, in which a stoichiometric excess of the polyisocyanate is first reacted with the high equivalent weight polyol to form a prepolymer, which is in a second step reacted with a chain extender and/or water to form the desired foam. Frothing methods may also be suitable. The so-called one-shot methods may also be used. In such one-shot methods, the polyisocyanate and all isocyanate-reactive components are simultaneously brought together and caused to react. Three widely used one-shot methods which are suitable for use herein include slabstock foam processes, high resiliency slabstock foam processes, molded foam methods and box foam methods.

Slabstock foam may be prepared by mixing the foam ingredients and dispensing them into a trough or other pour plate where the reaction mixture reacts, rises freely against the atmosphere (sometimes under a film or other flexible covering) and cures. In common commercial scale slabstock foam production, the foam ingredients (or various mixtures thereof) are pumped independently to a mixing head where they are mixed and dispensed onto a conveyor that is lined with paper or plastic. Foaming and curing occurs on the conveyor to form a foam bun.

High resilience slabstock (HR slabstock) foam may be made in methods similar to those used to make conventional slabstock foam but using higher equivalent weight polyols.

Molded foam may be made according to the invention by transferring the reactants (polyol composition including copolyester, polyisocyanate, blowing agent, and surfactant) to a closed mold, made of steel, aluminum or epoxy resin, where the foaming reaction takes place to produce a shaped foam. Either a so-called “cold- molding” process, in which the mold is not preheated significantly above ambient temperatures, or a “hot-molding” process, in which the mold is heated to drive the cure, may be used. Cold-molding processes are preferred to produce high resilience molded foam.

Box foam method consists in discontinuous foam production performed either with a simple mixer used to mix the foam components previously weighted with a scale or machines able to dose and mix the quantity of each product needed to prepare a foam block, in both cases the liquid resulting from the mixture of all components is being poured into a mould which defined the block size.

In accordance with the present disclosure, any type of flexible (conventional, high resilence, viscoelastic foams), semi-flexible or rigid polyurethane foams may be prepared using the modified polymer polyols of the present disclosure provided that the polyurethanes foam forming reactants, catalysts and additives are selected and processed in an appropiate known manner.

Polyurethane foams prepared from the stable modified polymer polyols of the present disclosure show a density from 4 to 120 kg/$m^3$, preferably 15 to 80 kg/$m^3$, most preferably 20 to 60 kg/$m^3$.

Using the modified polymer polyols of the present disclosure in the preparation of polyurethane foams results in the improvement of the fire retardant and resistance to thermal ageing properties of the foams thus obtained. Therefore, depending on the required burning test, the polyurethane foams obtained might not require any other fire retardant additive, although any additional known flame retardants additives may be used in the preparation of the polyurethane foams in combination with the modified polymer polyols of the present disclosure.

Using the modified polymer polyols of the present disclosure in the preparation of polyurethane foams results in foams which retain fire retardant properties longer than foams prepared with liquid fire retardant additives, avoiding the known migration problems thereof.

The modified polymer polyols according to the present disclosure show relative low viscosity, and a high phosphorus and nitrogen content. Thus, the modified polymer polyols are particularly useful in the preparation of polyurethane foams with improved fire retardant properties and reduced solids content.

Furthermore, the use of modified polymer polyols of the present disclosure in rigid foams reduces the values of thermal conductivity of the foams improving the insulation capacity of the foam.

In the context of the present disclosure, the term "modified polymer polyol" also termed as "polymer-polyol dispersions" or "polymeric polyols", refers to a dispersion of polymeric particles, i.e a dispersion of an organic filler, in a continuous phase made up of one or more compounds having multiple hydroxyl groups ("base polyol").

In the context of the present invention, the term functionality when referring to the compound bearing a basic-nitrogen atom is used herein to indicate the number average functionality (number of hydrogen atoms attached to nitrogen atoms per molecule) of the compound. The term "functionality", when referring to base polyols, is used herein to indicate the number average functionality (number of hydroxyl groups per molecule) of the polyol composition, on the assumption that it is the number average functionality (number of active hydrogen atoms per molecule) of the initiator(s) used in their preparations. Although in practice the real functionality will often be somewhat less because of some terminal unsaturation, for the purpose of characterizing the base polyols, the functionality of the polyol is the functionality of the initiator(s) used for its preparation.

In the context of the present invention, the term "iOH" refers to the hydroxyl number (iOH), defined as the number of milligrams of potassium hydroxide required for the complete hydrolysis of the fully phthalylated derivative prepared from 1 gram of polyol. The hydroxyl number is determined according to ASTM D4274-16.

In accordance with the context of the present disclosure, the terms "stable polyol" or "stable modified polymer polyols" refers to a dispersion of polymeric particles in the at least one polyol which does not settler out, or at least which will remain in dispersion during mixing with other foam forming ingredients.

In accordance with some examples of the present disclosure, the process should permit highly stable modified polymer polyols to be produced, in which the dispersed particles are small (and therefore less prone to settling). Surprisingly, the modified polymer polyols are stable even when the base polyol is a non-reactive polyether polyol, i.e. has mainly secondary hydroxyl groups.

In the context of the present invention, the term "molecular weight" of the polyol is calculated using the following equation $$MW\ \text{polyol} = \frac{56,1 \times \text{functionality}}{\text{Hydroxyl number } (iOH)} \times 1000$$

wherein "functionality" represents the functionality of the polyol, i.e. the average number of hydroxyl groups per molecule of polyol; and hydroxyl number (iOH) is calculated according to ASTM D4274-16.

In the context of the present invention viscosity measurements (in mPa·s) are obtained at 25° C. using a Haake™ Viscotester™ rheometer.

Formaldehyde emissions from polyurethane foams is determined according to the international standard UNE-ISO 16000-[Items 3, 9 and 11] following the indications of the CertiPUR Label for Flexible Polyurethane Foams.

The solid content of the modified polymer polyol is calculated using the following equation $$\text{Solid content (wt \%)} = \frac{Weight_{modified\ polymer\ polyol} - (Weight_{base\ pollol} + Weight_{dispersant})}{Weight_{modified\ polymer\ polyol}} \times 100$$

In the context of the present disclosure, the term "percentage (%) by weight" refers to the percentage of each ingredient of the combination or composition in relation to the total weight.

The modified polymer polyol "obtainable by" the process of the invention is used here to define the modified polymer polyol by the process for obtaining it and refers to the product obtainable by the preparation as defined herein. For the purposes of the invention the expressions "obtainable", "obtained" and equivalent expressions are used interchangeably, and in any case, the expression "obtainable" encompasses the expression "obtained".

For the purposes of the invention, any ranges given include both the lower and the upper end-points of the range. Ranges given, such as temperatures, times, sizes, and the like, should be considered approximate, unless specifically stated.

Although only a number of examples have been disclosed herein, other alternatives, modifications, uses and/or equivalents thereof are possible. Furthermore, all possible combinations of the described examples are also covered. Thus, the scope of the present disclosure should not be limited by particular examples, but should be determined only by a fair reading of the claims that follow.

The following examples are provided to illustrate the embodiments of the invention, but are not intended to limit the scope thereof. All parts and percentages are by weight unless otherwise indicated.

EXAMPLES

The following materials were used:

Polyol A—A sorbitol (functionality 6) initiated polyether polyol (PO/EO) with a hydroxyl number of 29.5 mgKOH/g, a content of polyethylene oxide terminal blocks of 16.2 wt %, a 81% of primary OH groups and a viscosity at 25° C. of 1500 mPa s Polyol B—A glycerol (functionality 3) initiated polyether polyol (PO/EO) with a hydroxyl number of 48 mgKOH/g, a content of polyethylene units, randomly distributed along the central backbone of the polyol, of 12 wt % and a viscosity at 25° C. of 560 mPa s.

Polyol C—A glycerol (functionality 3) initiated polyether polyol (PO) with a hydroxyl number of 56 mgKOH/g and a viscosity at 25° C. of 470 mPa s.

Polyol D—A glycerol (functionality 3) initiated polyether polyol (PO/EO) with a hydroxyl number of 28 mgKOH/g, a content of polyethylene oxide terminal blocks of 14 wt % and a viscosity at 25° C. of 1100 mPa s Polyol E—A glycerol (functionality 3) initiated polyether polyol (PO/EO) with a hydroxyl number of 55 mgKOH/g, a content of polyethylene units of 15 wt %, randomly distributed along the central backbone of the polyol and as terminal blocks (5,8 wt %)and a viscosity at 25° C. of 500 mPa s.

Polyol F—A glycerol (functionality 3) initiated polyether polyol (PO/EO) with a hydroxyl number of 35 mgKOH/g, a content of polyethylene oxide terminal blocks of 18 wt % and a viscosity at 25° C. of 870 mPa s.

Polyol G—A glycerol (functionality 3) initiated polyether polyol (PO/EO) with a hydroxyl number of 28 mgKOH/g, a content of polyethylene oxide terminal blocks of 15 wt % and a viscosity at 25° C. of 1100 mPa s.

THPS—Tetrakis(hydroxymethyl)phosphonium sulphate salt (70-75 wt % in water). Available from Sigma Aldrich.

KOH—Potassium hydroxide (85%). Available from Sigma Aldrich.

(3-isocyanatopropyl)triethoxysilane (also known as 3-(triethoxysilyl)propyl isocyanate) (95%). Available from Sigma Aldrich.

(3-isocyanatopropyl)trimethoxysilane (also known as 3-(trimethoxysilyl)propyl isocyanate) (>97%). Available from TCI Europe.

DBTL—Dibutyltin dilaurate (95%). Available from Sigma Aldrich.

Kosmos® PRO1—Stannous neodacanoate available from Evonik Industries.

Tetrafluoroboric acid solution (48%). Available from Sigma Aldrich.

Trimethoxy({3-[(oxiran-2-yl)methoxy]propyl})silane (also known as glycidoxypropyl-trimethoxysilane) (97%). Available from Acros Organics.

Urea (98%). Available from Sigma Aldrich.

Melamine (99%). Available from Sigma Aldrich.

Kosmos®-29—Tin Octoate available from Evonik Industries.Tegoamin® 33—A solution of 33 wt % triethylene diamine in dipropyleneglycol available from Evonik Industries.

Tegoamin® BDE—Solution of 70% Bis(2-dimethylaminoethyl)ether in dipropyleneglycol available from Evonik Industries.

Niax L-620LV—Silicone surfactant for polyurethane foam available from Momentive

TCPP—Tris(chloroisopropyl)phosphate. Available from Shekoy chemicals.

Melamine. Available from BASF.

TDI-80—Toluene diisocyanate (80/20). Available from Borsodchem

TDI 65—Toulene diisocyanate (65/35). Available from Borsodchem

Example 1 Preparation of NAD-Stabiliser A 112,68 g of Polyol A and 2,32 g of 3-(Triethoxysilyl) propyl isocyanate were placed in a 3 necked glass flask reactor equipped with mechanical stirring. The temperature was raised at 100° C., under stirring and nitrogen atmosphere, and maintained for 48 h. After that period of time the temperature was increased to 120° C. and kept at this temperature for 23 h. The complete reaction of 3-(Triethoxysilyl)propyl isocyanate was detected by the complete disappearance of the infrared isocyanate band at 2270 $cm^{-1}$. The product obtained, NAD-stabiliser A, was a viscous yellowish liquid.

Example 2. Preparation of NAD-Stabiliser B 116.68 g of Polyol A, 2.32 ml of 3-(Triethoxysilyl)propyl isocyanate and 34 mg of dibutyltin dilaurate were placed in a 3 necked glass flask reactor equipped with mechanical stirring. The temperature was raised at 80° C., under stirring and nitrogen atmosphere, and maintained for 30 min. The complete disappearance of the isocyanate band in the infrared spectra confirmed the completion of the reaction. A transparent liquid (NAD-stabiliser B) was obtained as reaction product.

Example 3. Preparation of NAD-Stabiliser C 149,98 g of Polyol A, 2.57 g of 3-(Trimethoxysilyl)propyl isocyanate and 67,6 mg of KOSMOS PRO1 were mixed in a 3 necked glass flask reactor equipped with mechanical stirring. The temperature was raised at 80° C., under stirring and nitrogen atmosphere, and maintained for 30 min. The complete disappearance of the isocyanate band in the infrared spectra confirmed the completion of the reaction. A transparent liquid (NAD-stabiliser C) was obtained as reaction product.

Example 4. Preparation of NAD-Stabilizer D

In a glass reactor equiped with mechanical stirrer 34,8 mg of Tetrafluoroboric acid solution (48%) were added to 61,54 g of Polyol A. After 5 minutes of stirring, 1,42 g of 3-Glycidoxypropyl-trimethoxysilane were added into the mixture and the reaction temperature was raised to 50° C. The temperature was maintained at 50° C. for 3 h. The resulting product (NAD-stabilizer D) was a transparent liquid.

Example 5 Preparation of THP Mixture A

A solution of KOH with a concentration of 0.166 g/mL was prepared by dissolving 87.04 g of KOH in 420 ml of ethanol. 390 mL of this solution was added slowly over 323.3 g of THPS solution (76.1%). After complete precipitation, the sulphate salt was filtered out and the filter cake was washed with additional 100 ml of pure methanol. The distillation was performed using a short path distillation device (model "KDLS", manufactured by UIC GmbH), under the conditions of a temperature of heating surface (temperature of thin film) of 130° C., a pressure of 1.0-1.1 kPa, a rotor revolution of 300 rpm, and a feeding rate of about 10 mL/minute to perform the thin film distillation. 101 g of product were collected. The composition of the product was analyzed by 31P-NMR. Results are shown in Table 1. Other minor components may be present.

TABLE 1

| mol % | | | | | | | | |
|---|---|---|---|---|---|---|---|---|
| THPO | mTHPO | dTHPO | tTHPO | THPS | THP | mTHP | dTHP | tTHP |
| 10.8 | 0.0 | 0.0 | 0.0 | 5.5 | 80.3 | 0.5 | 0.0 | 0.0 |

Example 6 Preparation of THP Mixture B 1500,3 g of THPS (tetrakis(hydroxymethyl)phosphonium sulfate solution (75%)) were placed in a glass reactor equipped with a mechanical stirrer. 1686 mL of a 0.186 g/mL solution of KOH (369 g of KOH flakes in 1300 g of Methanol) was added slowly over the THPS, resulting in the precipitation of potassium sulphate. After complete precipitation, the sulphate salt was filtered out and the volatile compounds of the resulting solution were distilled off in a rotavapor at a temperature of 100° C. taking 75 min to decrease the pressure to 25 mbar and maintaining it for another 15 minutes.

The % molar distribution of the different THP derivatives was determined by 31 P-NMR. Results are shown in Table 2. Other minor components may be present.

TABLE 2

| mol % | | | | | | | | |
|---|---|---|---|---|---|---|---|---|
| THPO | mTHPO | dTHPO | tTHPO | THPS | THP | mTHP | dTHP | tTHP |
| 8.5 | 0.0 | 0.0 | 0.0 | 0.8 | 55.9 | 29.6 | 4.9 | 0.2 |

Example 7 Preparation of THP Mixture C 700,1 g of THPS (tetrakis(hydroxymethyl) phosphonium sulfate solution (75%)) were placed in a glass reactor equipped with a mechanical stirrer. 779 ml of a 0.188 g/mL solution of KOH (172.2 g of KOH flakes in 600 g of Methanol) was added slowly over the THPS, resulting in the precipitation of potassium sulphate. After complete precipitation, the sulphate salt was filtered out and the volatile compounds of the resulting solution were distilled off in a rotavapor at a temperature of 50° C. taking 120 min to decrease the pressure to 25 mbar and maintaining it for another 15 minutes.

The % molar distribution of the different THP derivatives was determined by 31 P-NMR. Results are shown in Table 3. Other minor components may be present.

TABLE 3

| mol % | | | | | | | | |
|---|---|---|---|---|---|---|---|---|
| THPO | mTHPO | dTHPO | tTHPO | THPS | THP | mTHP | dTHP | tTHP |
| 7.4 | 0.0 | 0.0 | 0.0 | 0.7 | 38.3 | 39.7 | 12.7 | 1.2 |

Example 8 Preparation of THP Mixture D 301,5 g of THPS (tetrakis(hydroxymethyl) phosphonium sulfate solution (75%)) were placed in a glass reactor equipped with a mechanical stirrer. A solution of KOH (55,1 g of KOH flakes in 38.6 g of water) was added slowly over the THPS, resulting in the precipitation of potassium sulphate. Sulphate salt was filtered out and the volatile compounds of the resulting solution were distilled off in a rotavapor at a temperature of 100° C. taking 50 min to decrease the pressure to 20 mbar and maintaining it for another 15 minutes. A turbid liquid product was obtained which was cooled down to 25° C. and filtered again to obtain a transparent product.

The % molar distribution of the THP derivatives was determined by 31P-NMR. Results are shown in Table 4. Other minor components may be present.

TABLE 4

| mol % | | | | | | | | |
|---|---|---|---|---|---|---|---|---|
| THPO | mTHPO | dTHPO | tTHPO | THPS | THP | mTHP | dTHP | tTHP |
| 3.3 | 0.0 | 0.0 | 0.0 | 1.5 | 53.1 | 34.7 | 6.9 | 0.4 |

Example 9 Preparation of THP Mixture E

A solution of 205 grams of KOH and 143 grams of MiliQ water is prepared. 494 grams of THPS are weighed in a beaker provided with a mechanical stirrer. 186 g of the previous KOH/H2O solution are added slowly to the THPS. The product obtained is filtered throuhg a POBEL No 4 porous plate, obtaining 434 grams of solution and 240 grams of cake. The volatile compounds are removed in a rotary evaporator, 1 hour at 15 mbar and 100° C. in the thermal oil and the resulting product is filtered again. 187 g of product are obtained. The product is re-dissolved in 200 g of water and the resulting solution heated under air atmosphere (1 bar) for 24 h at 60° C. plus 8 additional hours at 100° C. Finally the product is vacuum dried (15 mbar at 100° C.) for 1 hour. 183 g of product are obtained The % molar distribution of the THP derivatives was determined by 31P-NMR. Results are shown in Table 5. Other minor components may be present.

TABLE 5

| mol % | | | | | | | | |
|---|---|---|---|---|---|---|---|---|
| THPO | mTHPO | dTHPO | tTHPO | THPS | THP | mTHP | dTHP | tTHP |
| 48.7 | 6.1 | 0.1 | 0.0 | 2.5 | 32.6 | 9.2 | 0.8 | 0.0 |

Example 10 Comparative Example 90.2 g of polyol B and 8.35 g of the THP mixture A were placed into a glass reactor equipped with mechanical stirring and the temperature was raised at 100° C. Once the temperature reaches 100° C. a solution of 6.09 g of urea in 9 mL of water, pre-heated at 40° C., was added into the reactor. Pressure was reduced to 400 mbar in order to remove volatile compounds. After distillation of volatiles, the temperature was raised to 120° C. and maintained for 3 hours under vacuum. Finally the temperature was raised to 140° C. and left at that temperature for 1 hour under vacuum.

The modified polymer polyol was unstable and the particles quickly settle.

Example 11 Preparation of Stable Modified Polymer Polyol 90,2 g of polyol B, 4.47 g of the NAD-stabilizer A and 8.37 g of the THP mixture A were placed into a glass reactor equipped with mechanical stirring and the temperature was raised at 100° C. Once the temperature reaches 100° C. a solution of 6.06 g of urea in 9 mL of water, pre-heated at 40° C., is added under vigorous stirring, into the reactor. Then, volatile compounds are removed under vacuum (400 mbar). After removal of volatile compounds the temperature was raised to 120° C. and the reaction was maintained at that temperature for 3 h under vacuum. Then, temperature was raised at 140° C. and kept at that temperature for 1 hour.

The product obtained was a white stable modified polymer polyol with a viscosity of 805 MPa s. The particle size was Bimodal with a largest fraction between 0.675 and 8.68 μm centered on 3.12 μm. A smaller fraction has 0.01 and 0,675 μm particles, centered on 0,376 μm The following table 6 summarize different examples done following the procedure described in example 11.

TABLE 6

| | Polyol | | NAD-stabilizer | | THP mixture | | Nitrogen containing compound | | Water |
|---|---|---|---|---|---|---|---|---|---|
| Example | Type | g | Type | g | Type | g | Type | g | g |
| 12 | Polyol B | 90.1 | A | 2.16 | A | 8.38 | Urea | 6.08 | 9 |
| 13 | Polyol B | 92.68 | A | 2.36 | A | 16.76 | Urea | 12.17 | 18 |
| 14 | Polyol B | 350.1 | B | 8.78 | B | 62.67 | Urea | 44.68 | 35 |
| 15 | Polyol B | 350.28 | B | 8.76 | B | 62.77 | Urea | 67.14 | 40 |
| 16 | Polyol B | 350.48 | B | 8.76 | C | 66.55 | Urea | 45.07 | 30 |
| 17 | Polyol B | 349.93 | B | 8.78 | C | 67.02 | Urea | 67.02 | 40 |
| 18 | Polyol C | 503.65 | B | 12.6 | B | 90.2 | Urea | 96.48 | 55 |
| 19 | Polyol B | 399.94 | B | 10 | D | 73.28 | Urea | 76.27 | 43 |
| 20 | Polyol D | 92.27 | A | 2.23 | A | 16.74 | Urea | 12.22 | 18 |
| 21 | Polyol B | 90.3 | C | 3.15 | D | 16.78 | Urea | 13.85 | 11 |
| 22 | Polyol D | 100.4 | C | 5.97 | D | 38.11 | Urea | 39.70 | 20 |
| 23 | Polyol B | 99.8 | C | 6.03 | D | 38.08 | Urea | 39.68 | 20 |
| 24 | Polyol B | 90.1 | C | 3.15 | D | 16.76 | Urea | 13.91 | 11 |
| 25 | Polyol B | 600.38 | B | 15.1 | D | 105.79 | Urea | 77.12 | 60 |
| 26 | Polyol B | 2505.0 | C | 89.85 | D | 467.86 | Urea | 485.84 | 200 |
| 27 | Polyol B | 90.2 | D | 3.1 | E | 16.4 | Urea | 17.0 | 8 |
| 28 | Polyol E | 91.0 | D | 3.2 | D | 17.4 | Urea | 17.41 | 7 |
| 29 | Polyol F | 90.3 | D | 3.2 | D | 17.6 | Urea | 17.9 | 8 |
| 30 | Polyol G | 90.2 | D | 3.2 | D | 17.1 | Urea | 17.2 | 7 |

Example 31. THP/Urea Pre-Mixture 89.5 g of polyol B, 3.3 g of the dispersant D were placed into a glass reactor equipped with mechanical stirring and the temperature was raised at 80° C. In another reactor, equipped with mechanical stirring, 17,2 g of urea, 16,9 g of THP mixture D and 7 g of water are heated to 80° C. obtaining a clear solution. The temperature is mainted at 80° C. for 30 min allowing the reaction of the THP mixture with urea, forming the so-called precondensate. The clear solution of the precondensate is added, under vigorous stirring, into the reactor. Then, volatile compounds are removed under vacuum (400 mbar). After removal of volatile compounds the temperature was raised to 120° C. and the reaction was maintained at that temperature for 3 h under vacuum. Then, temperature was raised at 140° C. and kept at that temperature for 1 hour.

Example 32. THP/Melamine Pre-Mixture 16,98 g of THP mixture D and 4,35 g of melamine are reacted under stirring at 90° C. until a clear solution is obtained. Then, a solution of Urea (6,88 g) in 8 g of water at 80° C. was added under stirring to the precondensated product of melamine and THP. The resulting clear mixture containing the THP-melamine precondensate and urea is added under vigorous stirring to a glass reactor containning 90,1 g o polyol B and 3,14 g of NAD-stabilizer D. Then, volatile compounds are removed under vacuum (400 mbar). After removal of volatile compounds the temperature was raised to 120° C. and the reaction was maintained at that temperature for 3 h under vacuum. Then, temperature was raised at 140° C. and kept at that temperature for 1 hour.

The results obtained for the stable modified polymer polyols are showed in the following table 7.

TABLE 7

| | Viscosity mPa s | Solid content (%) | Dx (10) | Dx (50) | Dx (90) | D [4; 3] | Particle size |
|---|---|---|---|---|---|---|---|
| Example 11 | 805 | 13.88 | 0.37 | 2.3 | 4.9 | 2.51 | Bimodal distribution with a largest fraction between 0.68 and 8.68 μm |

TABLE 7-continued

| | Viscosity mPa s | Solid content (%) | Dx (10) | Dx (50) | Dx (90) | D [4; 3] | Particle size |
|---|---|---|---|---|---|---|---|
| | | | | | | | centered on 3.12 μm. A smaller fraction has 0.01 and 0.68 μm particles, centered on 0.376 μm |
| Example 12 | 727 | 14.07 | 0.49 | 2.45 | 5.62 | 2.75 | Bimodal distribution with a largest fraction between 1.13 and 9.86 μm centered on 3.12 μm. A smaller fraction has 0.21 and 1.13 μm particles, centered on 0.59 μm |
| Example 13 | 868 | 20.11 | 0.48 | 1.91 | 5.00 | 2.36 | Bimodal distribution with a largest fraction between 0.99 and 9.86 μm centered on 4.03 μm. A smaller fraction has 0.21 and 0.99 μm particles, centered on 0.59 μm |
| Example 14 | 1031 | 16.3 | 0.367 | 2.78 | 5.81 | 2.86 | Two independent distributions with a largest fraction between 0.99 and 9.86 μm centered on 3.55 μm. A smaller fraction has 0.14 and 0.87 μm particles, centered on 0.40 μm |
| Example 15 | 1219 | 19.7 | 2.36 | 3.62 | 6.27 | 4.00 | Monomodal distribution with particles in the range between 1.45 and 9.86 μm centered on 3.12 μm. |
| Example 16 | 893 | 16.2 | 0.341 | 1.08 | 2.82 | 1.36 | Bimodal distribution with two fractions equally distributed, first fraction between 0.15 and 0.87 μm, centered on 0.46 μm, and second fraction from 0.87 to 5.92 μm centered on 1.65 μm. |

TABLE 7-continued

| | Viscosity mPa s | Solid content (%) | Dx (10) | Dx (50) | Dx (90) | D [4; 3] | Particle size |
|---|---|---|---|---|---|---|---|
| Example 17 | 1072 | 20.3 | 1.94 | 2.83 | 4.33 | 3.01 | Monomodal distribution with particles in the range between 1.13 and 7.64 μm centered on 2.42 μm. |
| Example 18 | 928 | 19.7 | 1.73 | 2.72 | 4.55 | 3.07 | Monomodal distribution with particles in the range between 0.99 and 8.68 μm centered on 2.42 μm. |
| Example 19 | 1082 | 19.5 | 2.88 | 6.43 | 11.2 | 6.78 | Monomodal distribution with particles in the range between 0.68 and 16.4 μm centered on 6.72 μm. |
| Example 20 | 1733 | 19.9 | 0.33 | 0.65 | 1.78 | 0.99 | Monomodal distribution with particles in the range between 0.15 and 2.13 μm centered on 0.52 μm and a small shoulder of particles centered on 3.55 μm |
| Example 21 | 835 | 20.1 | 0.33 | 1.07 | 3.89 | 1.64 | Bimodal distribution with a largest fraction between 0.13 and 0.87 μm centered on 0.46 μm. A smaller fraction has 0.87 and 6.72 μm particles, centered on 2.42 μm |
| Example 22 | 3635 | 31.2 | 0.39 | 0.89 | 2.7 | 1.34 | Monomodal distribution with particles in the range between 0.15 and 12.7 μm centered on 0.872 μm with two small shoulders centered at 2.75 and 7.64 μm |
| Example 23 | 1614 | 30.6 | 2.56 | 3.97 | 6.83 | 4.37 | Monomodal distribution with particles in the range between 1.65 and 9.86 μm centered on 3.55 μm. |
| Example 24 | 928 | 20.0 | 0.49 | 3.12 | 5.92 | 3.15 | Bimodal distribution with a largest fraction between 0.99 |

TABLE 7-continued

| | Viscosity mPa s | Solid content (%) | Dx (10) | Dx (50) | Dx (90) | D [4; 3] | Particle size |
|---|---|---|---|---|---|---|---|
| | | | | | | | and 8.68 μm centered on 4.03 μm. A smaller fraction has 0.19 and 0.99 μm particles, centered on 0.46 μm |
| Example 25 | 913 | 16.94 | 1.69 | 4.37 | 10.5 | 5.33 | Monomodal distribution with particles in the range between 0.59 and 18.7 μm centered on 4.58 μm. |
| Example 26 | 928 | 20.73 | 2.48 | 4.14 | 7.29 | 4.54 | Monomodal distribution with particles in the range between 1.28 and 11.2 μm centered on 3.55 μm. |
| Example 27 | 901 | 21.3 | 2.67 | 4.52 | 7.33 | 4.71 | Two independent distributions with a largest fraction between 1.65 and 11.2 μm centered on 4.58 μm. A smaller fraction has 0.24 and 0.77 μm particles, centered on 0.46 μm |
| Example 28 | 927 | 21.6 | 0.51 | 5.31 | 10.40 | 5.46 | Two independent distributions with a largest fraction between 1.65 and 16.4 μm centered on 5.92 μm. A smaller fraction has 0.19 and 0.99 μm particles, centered on 0.46 μm |
| Example 29 | 1619 | 21.6 | 0.34 | 0.59 | 0.95 | 0.62 | Monomodal distribution with particles in the range between 0.19 and 1.45 μm centered on 0.872 μm. |
| Example 30 | 1932 | 21.0 | 0.38 | 0.68 | 1.10 | 0.73 | Monomodal distribution with particles in the range between 0.19 and 1.55 μm centered on 0.68 μm. |
| Example 31 | 1058 | 20.8 | 0.50 | 5.01 | 9.64 | 5.15 | Two independent distributions with a largest fraction |

TABLE 7-continued

| | Viscosity mPa s | Solid content (%) | Dx (10) | Dx (50) | Dx (90) | D [4; 3] | Particle size |
|---|---|---|---|---|---|---|---|
| | | | | | | | between 1.45 and 16.4 µm centered on 5.21 µm. A smaller fraction has 0.21 and 1.13 µm particles, centered on 0.46 µm |
| Example 32 | 953 | 19.4 | 0.30 | 0.64 | 2.63 | 1.14 | Bimodal distribution with a largest fraction between 0.13 and 0.87 µm centered on 0.46 µm. A smaller fraction has 0.87 and 6.72 µm particles, centered on 1.65 µm. A small shoulder of particles centered at 3.55 µm is present |

Example 33 Preparation of Polyurethane Foams

A batch was prepared mixing water and amines according to the foam formulation shown in the table 8. Polyols and silicone were mixed for 50 seconds at 5000 rpm into a paper cup. The corresponding quantity of batch was added to the polyol/silicone mixture and stirred, and after 5 seconds the tin octoate was added and stirred for 5 more seconds. Then the isocyanate was added and stirring was maintained for 10 seconds.

The resulting mixture was poured into a 30.4×21.8×16.7 cm aluminum mold protected by kraft paper at 23° C. and the mixture was allowed to react in the mold for a period of 5 minutes, rise profile was monitored by a Foamat equipment. The resulting foam was removed from the mold, and allowed to cure in an oven at 100° C. for 15 minutes. After that curing step the foam was storaged at 23° C. and 50% relative humidity for at least 24 h.

The compositions prepared are showed in the following table 8.

TABLE 8

| | Comparative | Working examples | | | | | | |
|---|---|---|---|---|---|---|---|---|
| | example 1 | 1 | 2 | 3 | 4 | 5 | 6 | 7 |
| | | | | p.b.w | | | | |
| Polyol B | 100 | 50 | 50 | 50 | 65 | 80 | 80 | 0 |
| Polyol C | 0 | 0 | 0 | 0 | 0 | 0 | 0 | 50 |
| Example 18 | 0 | 50 | 0 | 0 | 0 | 0 | 0 | 0 |
| Example 19 | 0 | 0 | 50 | 0 | 35 | 20 | 0 | 50 |
| Example 20 | 0 | 0 | 0 | 50 | 0 | 0 | 0 | 0 |
| Example 26 | 0 | 0 | 0 | 0 | 0 | 0 | 20 | 0 |
| Total Water | 4.50 | 4.50 | 4.50 | 4.50 | 4.50 | 4.50 | 4.50 | 4.34 |
| Tegoamin BDE | 0.15 | 0.15 | 0.15 | 0.15 | 0.15 | 0.15 | 0.15 | 0.03 |
| Tegoamin 33 | 0 | 0 | 0 | 0 | 0 | 0 | 0 | 0.08 |
| KOSMOS_29 | 0.25 | 0.25 | 0.25 | 0.25 | 0.15 | 0.20 | 0.15 | 0.15 |
| Niax L-620 | 1.00 | 1.00 | 1.00 | 1.00 | 1.00 | 1.00 | 1.00 | 0.8 |
| TCPP | 17 | 0 | 0 | 0 | 0 | 0 | 0 | 0 |
| Melamine | 0 | 0 | 0 | 0 | 0 | 0 | 0 | 21.5 |
| TDI-80 | 54.87 | 28.13 | 27.46 | 27.46 | 27.43 | 27.43 | 41.2 | 53.9 |
| TDI-65 | 0 | 28.13 | 27.46 | 27.46 | 27.43 | 27.43 | 13.7 | 0 |
| Resilience, % ISO 8307 | 21 | 23 | 21 | 38 | 35 | 31 | 40 | 30 |
| Density, Kg/$m^3$ ISO 845 | 21.8 | 21.7 | 21.8 | 21.1 | 27.9 | 27.0 | 21.1 | 26.7 |
| CLD 25%, KPa ISO 3386/1 | 4.4 | 4.1 | 4.4 | 3.7 | 4.9 | 4.7 | 2.8 | 3.5 |
| CLD 40%, KPa ISO 3386/1 | 5.4 | 4.9 | 5.4 | 4.8 | 5.9 | 5.6 | 3.1 | 4.2 |

TABLE 8-continued

| | Comparative | Working examples | | | | | | |
|---|---|---|---|---|---|---|---|---|
| | example 1 | 1 | 2 | 3 | 4 | 5 | 6 | 7 |
| | | | | p.b.w | | | | |
| CLD 65%, KPa ISO 3386/1 | 11.5 | 10.1 | 11.5 | 11.4 | 13.1 | 11.9 | 6.3 | 2.9 |
| comp. set, 90% ISO 1856 | 13.1 | 15.9 | 13.1 | 19.4 | 13.3 | 16.4 | 9.5 | 21.5 |

Polyurethane Foams. Fire Behaviour.

The foams were analyzed following the standard UL94, (Horizontal Burning Foamed Material Test)

| | Comparative Example 1 | Working example 5 |
|---|---|---|
| Classification according to UL94 | No classification | HF1 |

The invention claimed is:

1. A method of preparing modified polymer polyol dispersions of polymeric particles in a liquid polyol mixture, the method comprising:

a) mixing at least one base polyol with at least one alkoxysilane capped polyether polyol, thus obtaining a liquid polyol mixture;

wherein the alkoxysilane capped polyether polyol has from 1 to 8 hydroxyl groups per molecule and from 1 to 2 alkoxysilane groups per molecule, wherein the alkoxysilane capped polyether polyol is obtainable by a process comprising capping from 1 to 2 of the terminal hydroxyl groups of a polyether polyol having a functionality from 2 to 9 and an average molecular weight selected from 3000 to 25000 with a capping agent;

wherein the capping agent is a compound having at least one alkoxysilane terminal group and at least one hydroxyl-reactive group; and wherein the reaction of the capping agent with the polyether polyol is carried out in a molar ratio selected from 0.05 to 2.0 mole of capping agent per mole of polyether polyol; and b) preparing the polymeric particles in the presence of the liquid polyol mixture.

2. A stable modified polymer polyol dispersion of polymeric particles in a liquid polyol mixture, wherein the stable modified polymer polyol dispersion is obtainable by a process comprising the preparation of polymeric particles, in the presence of the liquid polyol mixture, by a. reacting, in the liquid polyol mixture and under polymerisation conditions at least one compound bearing at least one basic-nitrogen atom a.1) characterized by the presence in the molecule of at least one hydrogen atom attached to a nitrogen atom; with a mixture a.2) of compounds bearing a phosphorus atom selected from [bis(hydroxymethyl)phosphanyl]methanol (THP), tetrakis(hydroxymethyl)phosphonium salt (THPX), [bis(hydroxymethyl)phosphoryl]methanol (THPO), ({[bis(hydroxymethyl)phosphanyl]methoxy}methanol (mTHP), {bis[(hydroxymethoxy)methyl]phosphanyl}methanol (dTHP), {bis[(hydroxymethoxy)methyl]phosphanyl}methoxy)methanol (tTHP), {[bis(hydroxymethyl)phosphoryl]methoxy}methanol (mTHPO), {bis[(hydroxymethoxy)methyl]phosphoryl}methanol (dTHPO) and ({bis [(hydroxymethoxy)methyl]phosphoryl}methoxy)methanol (tTHPO);

or a mixture of condensation products a.3) resulting from the reaction of the mixture of compounds bearing a phosphorus atom a.2) as described above and the at least one compound bearing at least one basic nitrogen atom a.1);

wherein the compound bearing at least one basic-nitrogen atom a.1) is selected from melamine, trimethylol melamine, a compound of formula (VII), a compound of formula (VIII); and mixtures thereof;

wherein the compound of formula (VII) is as follows $R_1$—$NH_2$ (VII)

wherein $R_1$ is selected from —H, —($C_1$-$C_3$) Alkyl, ($C_1$-$C_3$)Alkyl—CO—, $NH_2$—CO—, —$(CH_2)_n$—$NH_2$,—CN, —$NH_2$,—$SO_2NH_2$, cyclohexyl, phenyl, —$SO_2OH$ and —$NHCONHNH_2$; wherein n is an integer selected from 1-18;

and the compound of formula (VIII) is as follows:

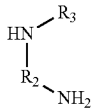

(VIII)

wherein $R_2$ is selected from NH═C<, O═C<and S═C<; and $R_3$ is selected from H, —CN, —$NH_2$,—$CONH_2$,—$CONHCONH_2$, and —$CONHCONHCONH_2$;

or alternatively b. reacting, in the liquid polyol mixture and under polymerisation conditions, optionally in the presence of a catalyst, b. 1) at least one of a co-reactant having an equivalent weight of up to 400 and at least one active hydrogen attached to a nitrogen or oxygen atom; with b.2) at least one polyisocyanate;

wherein the liquid polyol mixture comprises at least one base polyol and at least one alkoxysilane capped polyether polyol;

wherein the alkoxysilane capped polyether polyol has from 1 to 8 hydroxyl groups per molecule and from 1 to 2 alkoxysilane groups per molecule, wherein the alkoxysilane capped polyether polyol is obtainable by a process comprising capping from 1 to 2 of the terminal hydroxyl groups of a polyether polyol having a functionality from 2 to 9 and an average molecular weight selected from 3000 to 25000 with a capping agent;

wherein the capping agent is a compound having at least one alkoxysilane terminal group and at least one hydroxyl-reactive group; and wherein the reaction of the capping agent with the polyether polyol is carried out in a molar ratio selected from 0.05 to 2.0 mole of capping agent per mole of polyether polyol.

3. The stable modified polymer polyol dispersion according to claim 2, obtainable by a process which comprises i. mixing the at least one base polyol with the at least one alkoxysilane capped polyether polyol thus obtaining a liquid polyol mixture;

ii. adding to the liquid polyol mixture obtained in i) simultaneously or sequentially, in any order the at least one compound bearing at least one basic-nitrogen atom a.1) characterized by the presence in the molecule of at least one hydrogen atom attached to a nitrogen atom; and either.

the mixture a.2) of compounds bearing a phosphorus atom selected from

I. [bis(hydroxymethyl)phosphanyl]methanol (THP) in a concentration selected from 0-99.9 mol %, II. a tetrakis(hydroxymethyl) phosphonium salt (THPX) in a concentration selected from 0-50 mol %, III [bis(hydroxymethyl) phosphoryl]methanol (THPO) in a concentration selected from 0-99.9 mol %, IV {[bis(hydroxymethyl)phosphanyl]methoxy}methanol (mTHP) in a concentration selected from 0-80 mol %, V. {bis[(hydroxymethoxy)methyl]phosphanyl}methanol (dTHP) in a concentration selected from 0-30 mol %, VI. ({bis [(hydroxymethoxy)methyl]phosphanyl}methoxy)methanol (tTHP) in a concentration selected from 0-15 mol %, VII. {[bis(hydroxymethyl)phosphoryl]methoxy}methanol (mTHPO) in a concentration selected from 0-20 mol %, VIII. {bis[(hydroxymethoxy)methyl]phosphoryl}methanol (dTHPO) in a concentration selected from 0-10 mol %, and IX. ({bis[(hydroxymethoxy)methyl]phosphoryl}methoxy)methanol (tTHPO) in a concentration selected from 0-4 mol %;

being the sum total of compounds bearing a phosphorus atom in the mixture is 100 mol %;

or the mixture of condensation products a.3) resulting from the reaction of the mixture a.2) as described above and at least one compound bearing at least one basic nitrogen atom a.1);

wherein the compound bearing at least one basic-nitrogen atom a.1) is selected from melamine, trimethylol melamine, a compound of formula (VII), a compound of formula (VIII), and mixtures thereof;

wherein the compound of formula (VII) is according to $R_1$-$NH_2$ and wherein $R_1$ is selected from —H, —($C_1$-$C_3$)Alkyl, ($C_1$-$C_3$)Alkyl-CO—, $NH_2$—CO—, —$(CH_2)_n$-$NH_2$, —CN, —$NH_2$, —$SO_2NH_2$, cyclohexyl, phenyl, —$SO_2OH$ and —$NHCONHNH_2$, wherein n is an integer selected from 1-18; and wherein the compound of formula (VIII) is as follows:

(VIII)

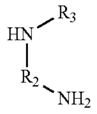

wherein $R_2$ is selected from NH═C<, O═C<and S═C<; and $R_3$ is selected from H, —CN, —$NH_2$, —$CONH_2$, —$CONHCONH_2$, and —$CONHCONHCONH_2$.

4. The stable modified polymer polyol dispersion according to claim 2, wherein.

the at least one compound bearing at least one basic-nitrogen atom a.1) is selected from:

melamine, trimethylol melamine;

the compound of formula (VII) wherein R1 is selected from H, methyl, —CN, $CH_3$ CO—, $NH_2$—CO—;

those compounds of formula (VIII) wherein R2 is selected from O=C<; S=C<; and $R_3$ is H; and mixtures thereof;

and the mixture a.2) of compounds bearing a phosphorus atom selected from:

I. [bis(hydroxymethyl)phosphanyl]methanol (THP) in a concentration selected from 35-85 mol %;

II. a tetrakis(hydroxymethyl)phosphonium salt (THPX) in a concentration selected from 0-30 mol %;

III. [bis(hydroxymethyl)phosphoryl]methanol (THPO) in a concentration selected from 0-40 mol %;

IV. {[bis(hydroxymethyl)phosphanyl]methoxy}methanol (mTHP) in a concentration selected from 0-80 mol %;

V. {bis[(hydroxymethoxy)methyl]phosphanyl}methanol (dTHP) in a concentration selected from 0-30 mol %;

VI. ({bis[(hydroxymethoxy)methyl]phosphanyl}methoxy)methanol (tTHP) in a concentration selected from 0-15 mol %;

VII. bis(hydroxymethyl)phosphorylmethoxymethanol (mTHPO) in a concentration selected from 0-20 mol %;

VIII. {bis[(hydroxymethoxy)methyl]phosphoryl}methanol (dTHPO) in a concentration selected from 0-10 mol %; and IX. ({bis[(hydroxymethoxy)methyl]phosphoryl}methoxy)methanol (tTHPO) in a concentration selected from 0-4 mol %;

being the sum total of compounds bearing a phosphorus atom in the mixture is 100 mol %.

5. The stable modified polymer polyol dispersion according to claim 2, wherein.

the at least one compound bearing at least one basic-nitrogen atom a.1) which is selected from melamine;

trimethylol melamine;

the compound of formula (VII) wherein $R_1$ is selected from H, methyl, —CN, $CH_3$ CO—, and $NH_2$—CO—;

the compound of formula (VIII) wherein $R_2$ is selected from O═C<; and S═C<; and $R_3$ is H; and mixtures thereof; and the mixture of condensation products a.3) is as defined in claim 2.

6. The stable modified polymer polyol dispersion according to claim 2, being obtainable by a process comprising i. mixing the at least one base polyol with the at least one alkoxysilane capped polyether polyol thus obtaining a liquid polyol mixture; and ii. adding to the liquid polyol mixture obtained in i) simultaneously or sequentially, in any order, optionally in the presence of a catalyst, and under polymerisation conditions, b.1) at least one of a co-reactant selected from an amine, an alkanolamine or a diol having an equivalent weight of up to 400 and at least one active hydrogen attached to a nitrogen or oxygen atom, and b.2) at least one polyisocyanate.

7. A process for preparing stable modified polymer polyol dispersions, the process comprising:

i. mixing at least one tetrakis(hydroxymethyl) phosphonium salt (THPX) with an aqueous or alcoholic solution of a base;

ii. optionally filtering out the resulting solution;

iii. distilling off solvent and volatiles, thus obtaining a mixture a.2) of compounds bearing a phosphorus atom selected from [bis(hydroxymethyl)phosphanyl]metanol (THP), tetrakis(hydroxymethyl) phosphonium salt (THPX), [bis(hydroxymethyl)phosphoryl]methanol (THPO), ({[bis(hydroxymethyl)phosphanyl] methoxy}methanol (mTHP), {bis[(hydroxymethoxy) methyl]phosphanyl}methanol (dTHP), {bis[(hydroxymethoxy)methyl]phosphanyl}methoxy)methanol (tTHP), {[bis(hydroxymethyl)phosphoryl]methoxy} methanol (mTHPO), {bis[(hydroxymethoxy)methyl] phosphoryl}methanol (dTHPO) and ({bis[(hydroxymethoxy)methyl]phosphoryl}methoxy)methanol (tTHPO);

iv. optionally filtering out the resulting solution, v. optionally oxidizing the product obtained in iii or the solution obtained in iv, thus obtaining the mixture a.2) with oxidized components;

vi. mixing the at least one base polyol with an at least one alkoxysilane capped polyether polyol, thus obtaining a liquid polyol mixture;

vii. preparing polymeric particles in the presence of the liquid polyol mixture obtained in vi by the reaction resulting from adding to the liquid polyol mixture obtained in vi simultaneously or sequentially in any order at least one compound a.1) bearing at least one basic-nitrogen atom characterized by the presence in the molecule of at least one hydrogen atom attached to a nitrogen atom and is selected from the compound of formula (VII) and the compound of formula (VIII); and the mixture a.2) of compounds bearing a phosphorus atom obtained in iii or iv, the oxidized mixture a.2) obtained in v, or mixtures thereof;

wherein the alkoxysilane capped polyether polyol has from 1 to 8 hydroxyl groups per molecule and from 1 to 2 alkoxysilane groups per molecule, wherein the alkoxysilane capped polyether polyol is obtainable by a process comprising capping from 1 to 2 of the terminal hydroxyl groups of a polyether polyol having a functionality from 2 to 9 and an average molecular weight selected from 3000 to 25000 with a capping agent, wherein the capping agent is a compound having at least one alkoxysilane terminal group and at least one hydroxyl-reactive group;

wherein the reaction of the capping agent with the polyether polyol is carried out in a molar ratio selected from 0.05 to 2.0 mole of capping agent per mole of polyether polyol;

wherein the compound of formula (VII) is as follows $R_1$—$NH_2$ (VII)

wherein $R_1$ is —H, —$(C_1$-$C_3)$Alkyl, $(C_1$-$C_3)$Alkyl-CO—, $NH_2$—CO—, —$(CH_2)_n$-$NH_2$,—CN, —$NH_2$,—$SO_2NH_2$, cyclohexyl, phenyl, —$SO_2OH$ or —$NHCONHNH_2$, wherein n is an integer selected from 1-18;

and wherein the compound of formula (VIII) is as follows:

(VIII)

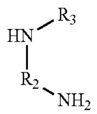

wherein $R_2$ is selected from NH═C< and O═C<; S═C<; and $R_3$ is selected from H, —CN, —$NH_2$,—$CONH_2$,—$CONHCONH_2$, and —$CONHCONHCONH_2$.

8. A process for preparing a polyurethane material wherein the process comprises reacting at least one polyisocyanate with an isocyanate-reactive component which comprises at least one stabilized modified polymer polyol dispersion as defined in claim 2, in the presence of at least one catalyst and optionally additives.

9. A polyurethane material obtainable by the process of claim 8.

10. An article of manufacture comprising the polyurethane material as defined in claim 9.

11. A method of preparing the stable modified polymer polyol dispersion according to claim 2, the method comprising a. reacting, in a liquid polyol mixture and under polymerisation conditions a.1) at least one compound bearing at least one basic-nitrogen atom characterized by the presence in the molecule of at least one hydrogen atom attached to a nitrogen atom;

with either a.2) or a.3), wherein a.2) is a mixture of compounds bearing a phosphorus atom selected from [bis(hydroxymethyl)phosphanyl] metanol (THP), tetrakis(hydroxymethyl) phosphonium salt (THPX), [bis(hydroxymethyl)phosphoryl]methanol (THPO), ({[bis(hydroxymethyl)phosphanyl] methoxy}methanol (mTHP), {bis[(hydroxymethoxy) methyl]phosphanyl}methanol (dTHP), {bis [(hydroxymethoxy)methyl]phosphanyl}methoxy) methanol (tTHP), {[bis(hydroxymethyl)phosphoryl] methoxy}methanol (mTHPO), {bis[(hydroxymethoxy) methyl]phosphoryl}methanol (dTHPO) and ({bis [(hydroxymethoxy)methyl]phosphoryl}methoxy) methanol (tTHPO);

and a.3) is a mixture of condensation products resulting from the reaction of the mixture of compounds bearing a phosphorus atom a.2) as described above and the at least one compound bearing at least one basic nitrogen atom a. 1);

wherein the compound bearing at least one basic-nitrogen atom a. 1) is selected from melamine, trimethylol melamine, a compound of formula (VII), a compound of formula (VIII); and mixtures thereof;

wherein the compound of formula (VII) is as follows $R_1$—$NH_2$ (VII)

wherein $R_1$ is selected from —H, —($C_1$-$C_3$)Alkyl, ($C_1$-$C_3$)Alkyl—CO—, $NH_2$—CO—, —$(CH_2)_n$—$NH_2$,—CN, —$NH_2$,—$SO_2NH_2$, cyclohexyl, phenyl, —$SO_2OH$ and —$NHCONHNH_2$, wherein n is an integer selected from 1-18;

and the compound of formula (VIII) is as follows:

(VIII)

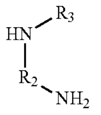

wherein $R_2$ is selected from NH═C<, O═C<and S═C<; and $R_3$ is selected from H, —CN, —$NH_2$,—$CONH_2$,—$CONHCONH_2$, and —$CONHCONHCONH_2$;

or alternatively b. reacting, in the liquid polyol mixture and under polymerisation conditions, optionally in the presence of a catalyst, b. 1) at least one of a co-reactant having an equivalent weight of up to 400 and at least one active hydrogen attached to a nitrogen or oxygen atom; with b.2) at least one polyisocyanate;

wherein the liquid polyol mixture comprises:

at least one base polyol; and at least one alkoxysilane capped polyether polyol having from 1 to 8 hydroxyl groups per molecule and from 1 to 2 alkoxysilane groups per molecule, obtainable by a process comprising capping from 1 to 2 of the terminal hydroxyl groups of a polyether polyol having a functionality from 2 to 9 and an average molecular weight selected from 3000 to 25000 with a capping agent which is a compound having at least one alkoxysilane terminal group and at least one hydroxyl-reactive group; wherein the reaction of the capping agent with the polyether polyol is carried out in a molar ratio selected from 0.05 to 2.0 mole of capping agent per mole of polyether polyol.

12. The method according to claim 11, wherein the capping agent is a compound of formula (I):

(I)

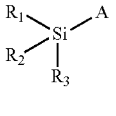

wherein $R_1$, $R_2$ and $R_3$ are each independently selected from linear or branched ($C_1$-$C_6$)alkyl radical, linear or branched ($C_1$-$C_6$)alkoxyl radical and tri($C_1$-$C_3$)alkylsilyloxyl radical; with the proviso that at least one of $R_1$, $R_2$ or $R_3$ is a ($C_1$-$C_6$)alkoxyl radical; and wherein A is selected from the group consisting of a compound of formula (II), (III), (IV), (V) and (VI)

(II)

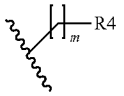

(III)

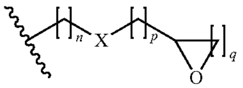

(IV)

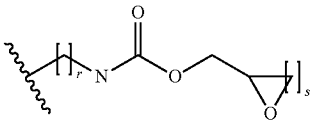

(V)

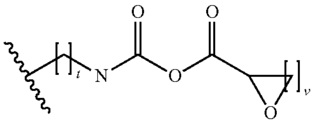

(VI)

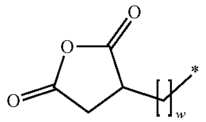

wherein the wavy line means the point of attachment to the Si atom in formula (I);

m, n, p, r, t and w are independently an integer selected from 1 to 6;

q, s and v are independently an integer selected from 1 to 4;

$R_4$ is a radical selected from —NCO.

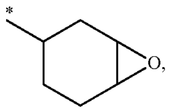 and 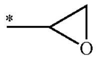

wherein the asterisk indicates the point of attachment to the rest of the group;

X is selected from —O— and —N($R_5$)—;

wherein $R_5$ is a radical selected from H, linear or branched ($C_1$-$C_6$)alkyl,

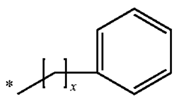 and 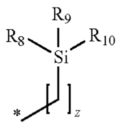

wherein the asterisk indicates the point of attachment to the N atom;

x and z are independently an integer selected from 1 to 6; and $R_8$, $R_9$ and $R_{10}$ are each independently selected from linear or branched ($C_1$-$C_6$)alkyl radical, linear or branched ($C_1$-$C_6$)alkoxyl radical, and tri($C_1$-$C_3$)alkylsilyloxyl radical; with the proviso that at least one of $R_8$, $R_9$ or $R_{10}$ is a ($C_1$-$C_6$)alkoxyl radical or a tri($C_1$-$C_3$)alkylsilyloxyl radical; and wherein the reaction of b) with a) is carried out in a molar ratio selected from 0.05 to 2.0 mole of compound of formula (I) per mole of polyether polyol.

13. The method according to claim 11, wherein the compound of formula (I) is those wherein $R_1$, $R_2$ and $R_3$ are each independently selected from $CH_3$-O—, $CH_3CH_2$—O—, $CH_3CH_2CH_2$—O—, $(CH_3)_2CH$—O—, $CH_3CH_2CH_2CH_2$—O—, $(CH_3)_3CH$—O—, $(CH_3)_2CHCH_2$—O—, $CH_3$—, $CH_3CH_2$—, $CH_3CH_2CH_2$—, $(CH_3)_2CH$—, $CH_3CH_2CH_2CH_2$—, $(CH_3)_3CH$—, $(CH_3)_2CHCH_2$—, $(CH_3)_3Si$—O—, and $(CH_3CH_2)_3Si$—O—; with the proviso that at least one of $R_1$, $R_2$ or $R_3$ is a ($C_1$-$C_3$) alkoxyl radical.

14. The method according to claim 11, wherein the alkoxysilane capped polyether polyol having from 1 to 8 hydroxyl groups per molecule and from 1 to 2 alkoxysilane groups per molecule, obtainable by a process comprising capping a) from 1 to 2 of the terminal hydroxyl groups of at least a polyether polyol having a functionality from 2 to 9 and an average molecular weight selected from 6000 to 20000, which is obtainable by reacting ethylene oxide and/or propylene oxide with a polyhydric alcohol selected from glycerol, sorbitol, trimethylolpropane, diethylene glycol, butanetriol, pentanetriol, hexanetriol and tetaerythriol; with a capping agent which is b) at least a capping alkoxysilane group-containing agent which is a compound of formula (I)

(I)

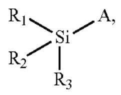

wherein $R_1$, $R_2$ and $R_3$ are each independently selected from linear or branched ($C_1$-$C_6$)alkyl radical, linear or branched ($C_1$-$C_6$)alkoxyl radical and tri($C_1$-$C_3$)alkylsilyloxyl radical; with the proviso that at least one of $R_1$, $R_2$ or $R_3$ is a ($C_1$-$C_6$)alkoxyl radical; and wherein the radical A is selected from a compound of formula (II):

(II)

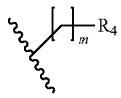

wherein m is an integer selected from 1 to 6; and $R_4$ is selected from —NCO,

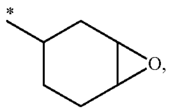, and 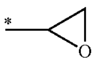

wherein the asterisk indicates the point of attachment to the rest of the group;

a compound of formula (III)

(III)

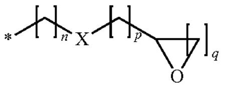

wherein n and p are independently an integer selected from 1 to 6, q is an integer selected from 1 to 3, X is selected from —O— and —N($R_5$)—, wherein $R_5$ is a radical selected from H, linear or branched ($C_1$-$C_6$) alkyl,

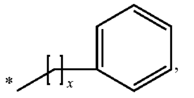, and 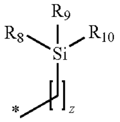

wherein the asterisk indicates the point of attachment to the N atom;

x and z are independently an integer selected from 1 to 6; and $R_8$, $R_9$ or $R_{10}$ are each independently selected from —$CH_3$,—$CH_2CH_3$,—$OCH_3$,—$OCH_2CH_3$,—O—Si$(CH_3)_3$, and —O—Si$(CH_2CH_3)_3$;

a compound of formula (IV) and (V)

(IV)

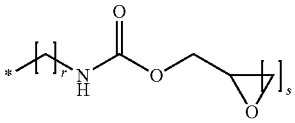

(V)

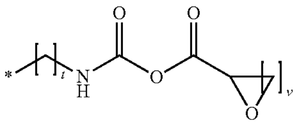

wherein r and t are independently an integer selected from 1 to 4;

v is an integer selected from 1 to 4; and s is an integer selected from 1 to 3;

and a compound of formula (VI)

(VI)

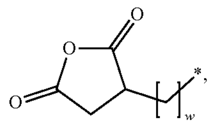

wherein w is an integer selected from 1 to 4.

15. The method according to claim 12, wherein the compound of formula (I) is selected from (3-isocyanatopropyl)trimethoxysilane, (3-isocyanatopropyl)dimethoxy(methyl)silane, (3-isocyanatopropyl)(methoxy)dimethylsilane, (3-isocyanatopropyl)dimethoxy-ethylsilane, (3-isocyanatopropyl)triethoxysilane, (3-isocyanatopropyl)diethoxy(ethyl)silane, triethoxy(2-isocyanatoethyl)silane, triethoxy(isocyanatomethyl)silane, trimethoxy({3-[(oxiran-2-yl)methoxy]propyl})silane, dimethoxy(methyl){3-[(oxiran-2-yl)methoxy]propyl}silane, methoxydimethyl{3-[(oxiran-2-yl)methoxy]propyl}silane, dimethoxy(ethyl){3-[(oxiran-2-yl)methoxy]propyl}silane, triethoxy({3-[(oxiran-2-yl)methoxy]propyl})silane, diethoxy-ethyl-[3-(oxiran-2-ylmethoxy)propyl]silane, 3-(trimethoxysilyl)-N-(3-(trimethoxysilyl)propyl)—N—((oxiran-2-yl) methyl)

propan-1-amine, 3-(triethoxysilyl)-N-(3-(triethoxysilyl)propyl)—N—((oxiran-2-yl)methyl)propan-1-amine, N, N-bis((trimethoxysilyl)methyl)(oxiran-2-yl)methanamine, 3-trimethoxysilylpropylcarbamoyl oxirane-2-carboxylate, 3-triethoxysilylpropylcarbamoyl oxirane-2-carboxylate, 3-trimethoxysilylethylcarbamoyl oxirane-2-carboxylate, 3-triethoxysilylethylcarbamoyl oxirane-2-carboxylate, 3-[3-(triethoxysilyl)propyl]oxolane-2,5-dione, and 3-[3-(trimethoxysilyl)propyl]oxolane-2,5-dione.

16. The method according to claim 11, wherein the at least one polyether polyol has a functionality from 3-6; an average molecular weight selected from 6000 to 20000; and a viscosity at 25° C. from 200 to 8000 mPa s.

17. A stable modified polymer polyol dispersion of polymeric particles in a liquid polyol mixture, wherein the stable modified polymer polyol dispersion is obtainable by a process comprising the preparation of polymeric particles, in the presence of the liquid polyol mixture, by a. reacting, in the liquid polyol mixture and under polymerisation conditions at least one compound bearing at least one basic-nitrogen atom a. 1) characterized by the presence in the molecule of at least one hydrogen atom attached to a nitrogen atom;

with a mixture a.2) of compounds bearing a phosphorus atom which comprises:

I. [bis(hydroxymethyl)phosphanyl]methanol (THP) in a concentration from 0-99.9 mol %;

II a tetrakis(hydroxymethyl)phosphonium salt (THPX) in a concentration from 0-50 mol %;

III. [bis(hydroxymethyl)phosphoryl]methanol (THPO) in a concentration from 40-99.9 mol %;

IV {[bis(hydroxymethyl)phosphanyl]methoxy}methanol (mTHP) in a concentration from 0-80 mol %;

V. {bis[(hydroxymethoxy)methyl]phosphanyl}methanol (dTHP) in a concentration from 0-30 mol %;

VI. ({bis[(hydroxymethoxy)methyl]phosphanyl}methoxy)methanol (tTHP) in a concentration from 0-15 mol %;

VII. {[bis(hydroxymethyl)phosphoryl]methoxy}methanol (mTHPO) in a concentration from 0-20 mol %;

VIII. {bis[(hydroxymethoxy)methyl]phosphoryl}methanol (dTHPO) in a concentration from 0-10 mol %; and IX. ({bis[(hydroxymethoxy)methyl]phosphoryl}methoxy)methanol (tTHPO) in a concentration from 0-4 mol %;

X. optionally at least one other compound bearing a phosphorus atom;

being the sum total of compounds bearing a phosphorus atom in the mixture 100 mol %; or a mixture of condensation products a.3) resulting from the reaction of the mixture of compounds bearing a phosphorus atom a.2) as described above and the at least one compound bearing at least one basic nitrogen atom a.1);

wherein the compound bearing at least one basic-nitrogen atom a.1) is selected from melamine, trimethylol melamine, a compound of formula (VII), a compound of formula (VIII); and mixtures thereof;

wherein the compound of formula (VII) is as follows $R_1—NH_2$ (VII)

wherein $R_1$ is selected from —H, —($C_1$-$C_3$)Alkyl, ($C_1$-$C_3$)Alkyl—CO—, $NH_2$—CO—, —$(CH_2)_nNH_2$,—CN, —$NH_2$,—$SO_2NH_2$, cyclohexyl, phenyl, —$SO_2OH$ and —NHCONHNH$_2$; wherein n is an integer selected from 1-18;

and the compound of formula (VIII) is as follows:

(VIII)

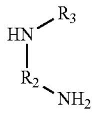

wherein $R_2$ is selected from NH═C<, O═C<and S═C<; and $R_3$ is selected from H, —CN, —$NH_2$,—$CONH_2$,—$CONHCONH_2$, and —CONHCONHCONH$_2$;

or alternatively b. reacting, in the liquid polyol mixture and under polymerisation conditions, optionally in the presence of a catalyst, b.1) at least one of a co-reactant having an equivalent weight of up to 400 and at least one active hydrogen attached to a nitrogen or oxygen atom; with b.2) at least one polyisocyanate;

wherein the liquid polyol mixture comprises at least one base polyol and at least one alkoxysilane capped polyether polyol;

wherein the alkoxysilane capped polyether polyol has from 1 to 8 hydroxyl groups per molecule and from 1 to 2 alkoxysilane groups per molecule, wherein the alkoxysilane capped polyether polyol is obtainable by a process comprising capping from 1 to 2 of the terminal hydroxyl groups of a polyether polyol having a functionality from 2 to 9 and an average molecular weight selected from 3000 to 25000 with a capping agent;

wherein the capping agent is a compound having at least one alkoxysilane terminal group and at least one hydroxyl-reactive group; and wherein the reaction of the capping agent with the polyether polyol is carried out in a molar ratio selected from 0.05 to 2.0 mole of capping agent per mole of polyether polyol.

* * * * *